United States Patent [19]

Mori

[11] Patent Number: 6,157,605
[45] Date of Patent: Dec. 5, 2000

[54] OPTICAL DISC APPARATUS

[75] Inventor: Hidenori Mori, Kanagawa, Japan

[73] Assignee: Sony Corporation, Tokyo, Japan

[21] Appl. No.: 09/163,770

[22] Filed: Sep. 30, 1998

[30] Foreign Application Priority Data

Oct. 2, 1997 [JP] Japan ..................................... 9-270170

[51] Int. Cl.⁷ ............................. G11B 33/04; G11B 33/14
[52] U.S. Cl. ........................................ 369/77.2; 369/75.1
[58] Field of Search ................................... 369/75.1–77.2;
360/99.02, 99.06

[56] References Cited

U.S. PATENT DOCUMENTS

| | | | |
|---|---|---|---|
| 3,992,018 | 11/1976 | Plummer et al. | 369/72 |
| 4,802,041 | 1/1989 | Uehara | 360/99.06 |
| 4,811,137 | 3/1989 | Muto et al. | 369/77.2 |
| 5,220,552 | 6/1993 | Yokoi et al. | 369/77.2 |

FOREIGN PATENT DOCUMENTS

| | | |
|---|---|---|
| 4-069886 | 3/1992 | Japan . |
| 4-090186 | 3/1992 | Japan . |
| 5-182437 | 7/1993 | Japan . |
| 6-267257 | 9/1994 | Japan . |
| 7-182842 | 7/1995 | Japan . |
| 7-201166 | 8/1995 | Japan . |
| 8-339675 | 12/1996 | Japan . |

*Primary Examiner*—William Klimowicz
*Attorney, Agent, or Firm*—Jay H. Maioli

[57] ABSTRACT

An optical disc device 60 prevents intrusion of foreign matter such as dust and dirt into a disc cartridge 1 that has a main cartridge body unit 4 for rotatably housing an optical disc 5, apertures 7, 8 for partially exposing a signal recording area of the optical disc 5 and a shutter member 9 movably mounted on the main cartridge body unit for closing the apertures 7, 8. The optical disc device also includes a loading mechanism 76 for loading the disc cartridge 1 across the inside and the outside of the main body portion of the device, a shutter actuating unit 154 for moving the shutter member 9 for opening the recording/reproducing apertures 7, 8 when the disc cartridge 1 is loaded on the recording/reproducing unit adapted for recording and/or reproducing information signals and an optical pickup device 143 for intruding into the disc housing via the recording/reproducing aperture when the shutter member 9 has opened the recording/reproducing aperture.

18 Claims, 23 Drawing Sheets

OPTICAL DISC APPARATUS

BACKGROUND OF THE INVENTION

1. Field of the Invention

This invention relates to an optical disc apparatus for recording and/or reproducing information signals using e.g., an optical head.

2. Description of the Related Art

Conventionally, an optical disc apparatus, adapted for recording and/or reproducing an optical disc rotatably accommodated in a disc cartridge, has a recording/reproducing unit for an optical disc in the main body unit of the apparatus. On a base block of the recording/reproducing unit are assembled a disc rotation unit for rotationally driving the optical disc and an optical head for recording and/or reproducing information signals. This optical head faces the recording/reproducing unit via an opening formed in the base block and is fed along the radius of the optical disc by a feed unit.

If a disc cartridge is loaded on the recording/reproducing unit of the optical disc apparatus, a shutter member, adapted for closing an aperture formed in the disc cartridge for partially exposing the optical disc accommodated in the cartridge, is moved to open the aperture in the disc cartridge. In this optical disc apparatus, the disc rotation unit runs the optical disc in rotation, while the optical head illuminates the light beam on the optical disc facing the aperture formed in the disc cartridge to record or reproduce information signals.

That is, if the disc cartridge is loaded on the recording/reproducing unit of the optical disc apparatus, the shutter member is moved to and kept at the position of opening the aperture in the disc cartridge.

Meanwhile, there is such an optical disc in which, for increasing the recording capacity for information signals for recording, a signal recording layer is formed on a disc substrate, and a light-transmitting layer about 0.1 mm in thickness is formed on this signal recording layer, with the side of the light-transmitting layer of the optical disc being used as a signal recording surface. For this optical disc, an optical pickup device is used which employs an objective lens having the numerical aperture NA of 0.7 or higher and a wavelength not larger than 680 nm. With this optical disc device, the separation between the signal recording surface of the optical disc and the objective lens, that is the working distance, is set to 560 m or less. With such optical disc in which the optical head is extremely close to the signal recording surface, there are occasions wherein, if contaminants such as dust and dirt are affixed to the signal recording surface of the optical disc, these contaminants are affixed to the objective lens of the optical pickup apparatus to contaminate the objective lens.

SUMMARY OF THE INVENTION

It is therefore an object of the present invention to provide an optical disc apparatus in which it is possible to prevent intrusion of contaminants, such as dust and dirt, into the inside of the disc cartridge to enable reliable recording and/or reproduction of information signals.

The present invention provides an optical disc device for recording/reproduction having a main cartridge body unit rotatably holding an optical disc, an aperture formed in the main cartridge body unit for partially exposing a signal recording area of the optical disc to outside and a shutter member mounted on the main cartridge body unit for movement for closing the aperture. The optical disc device includes loading means for loading the disc cartridge across inside and outside of a main body portion of the optical disc device, shutter actuating means for causing movement of the shutter member for opening the aperture in the cartridge after the disc cartridge is loaded on the recording/reproducing unit adapted for recording and/or reproducing information signals and recording and/or reproducing means for intruding into the main cartridge body unit via the aperture on opening of the aperture by the shutter member for recording and/or reproducing information signals.

If, with the optical disc device, recording and/or reproducing means is to be used for recording and/or reproduction of information signals, such as during recording and/or reproduction of information signals, or during track jumping, the shutter member is moved by shutter actuating means to the state of opening the aperture in the disc cartridge, in order to intrude the recording and/or reproducing means via recording/reproducing aperture into the main cartridge body unit to provide a predetermined working distance. If the optical disc is not to be run in rotation, such as during non-operating time, the recording and/or reproducing means is receded out of the main cartridge body unit, while the shutter member is moved by shutter actuating means to the state in which the aperture in the disc cartridge is closed by the shutter member by the shutter actuating means. That is, the aperture in the disc cartridge is opened only when the recording and/or reproducing means is to be used, while it is otherwise closed by the shutter member during the stand-by time.

Specifically, with the optical disc device, if recording and/or reproducing means is to be used for recording and/or reproduction of information signals, such as during recording and/or reproduction of information signals or during track jumping, the shutter member is moved by shutter actuating means to the state of opening the recording/reproducing aperture, in order to intrude the recording and/or reproducing means via recording/reproducing aperture into the main cartridge body unit so as to provide a predetermined working distance. If the optical disc is not to be run in rotation, such as during non-operating time, the recording and/or reproducing means is receded out of the main cartridge body unit, with the shutter member being moved by shutter actuating means to the state in which the aperture in the disc cartridge is closed by the shutter member by the shutter actuating means. That is, the recording/reproducing aperture in the disc cartridge is opened only in case of using the recording and/or reproducing means and is otherwise closed such as during stand-by time. It is possible with the optical disc device to prevent foreign matter such as dust and dirt from entering the disc cartridge via the recording/reproducing aperture so as to be deposited on the signal recording surface of the optical disc held in the main cartridge body unit in order to assure recording and/or reproduction of information signals and in order to prevent the foreign matter deposited on the signal recording surface of the optical disc from colliding against the recording and/or reproducing means to contaminate the recording and/or reproducing means.

DESCRIPTION OF THE PREFERRED EMBODIMENTS

Figure 1:
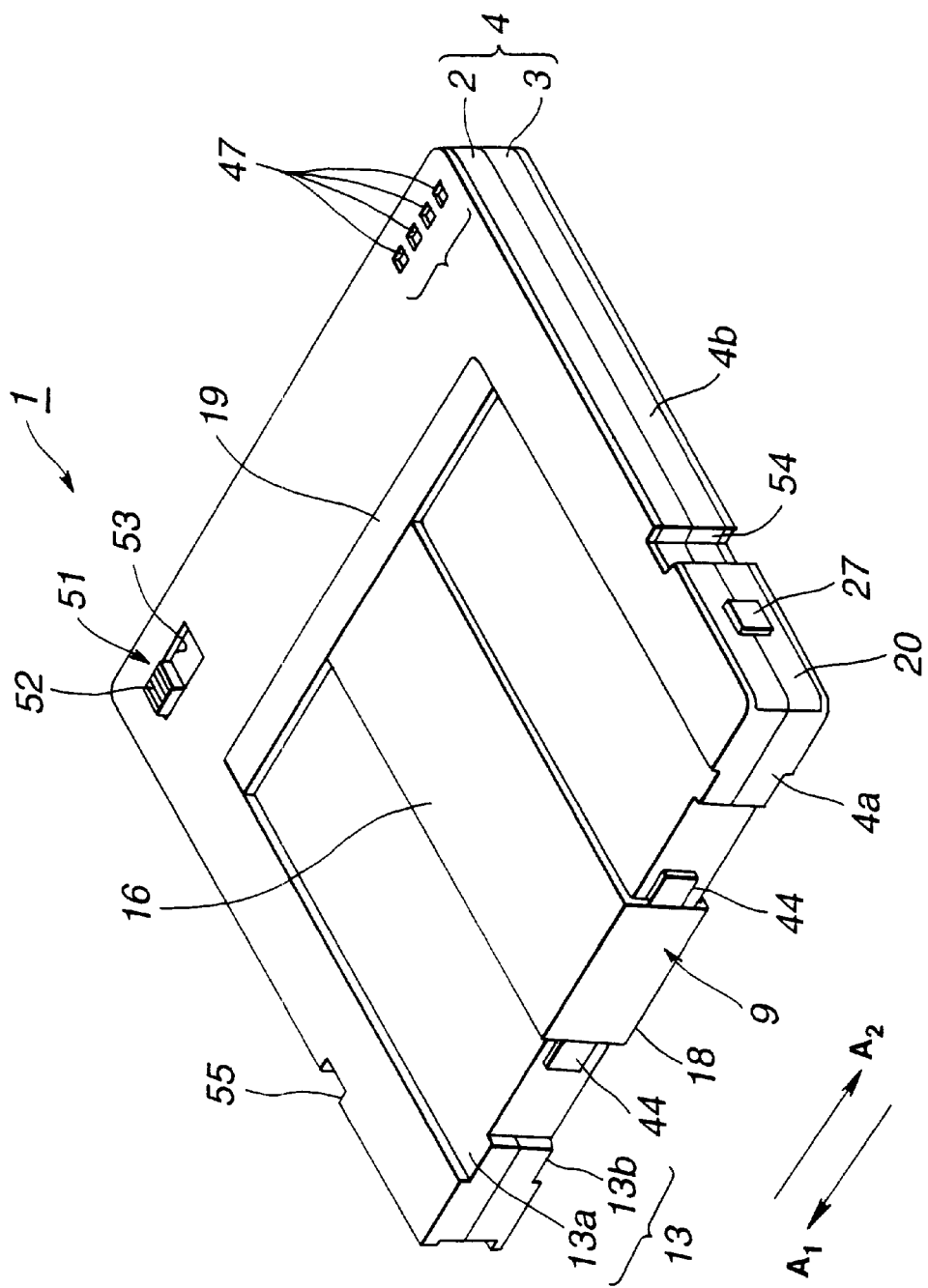
FIG. 1 is an overall perspective view of a disc cartridge according to an embodiment of the present invention.

Referring to the drawings, an optical disc device of the present invention will be explained in detail.

A disc cartridge 1 employed in this optical disc device includes a main cartridge body unit 4 prepared by abutting an upper cartridge half 2 and a lower cartridge half 3 and combining these halves at respective comer portions by set screws, adhesive or by ultrasonic welding. The upper and lower halves are molded from a synthetic resin material into a substantially rectangular shape. In this main cartridge body unit 4 is housed an optical disc 5 as a recording medium for information signals. In the upper and lower surfaces of the main cartridge body unit 4 are bored recording and/or reproducing apertures 7, 8 extending from the center to the front surface of the main cartridge body unit 4 and which are faced by a disc table of a disc rotation unit arranged in the optical disc device and by an optical pickup device configured for recording and/or reproducing information signals, such as video or audio signals, for the optical disc 5 run in rotation by the disc rotation unit. These recording and/or reproducing apertures 7, 8 are closed by a shutter member 9 slidably mounted on the main cartridge body unit 4. The shutter member 9 is opened only during use when the disc cartridge 1 is loaded on the recording and/or reproducing apparatus to prevent intrusion of dust and dirt into the main cartridge body unit 4, to prevent hand or finger from contacting with a signal recording area 5c of the optical disc 5 and to prevent dust and dirt or fingerprints from being deposited on at least the signal recording area 5c to inhibit recording/reproducing errors for information signals.

The upper cartridge half 2 and the lower cartridge half 3 of the main cartridge body unit 4 are formed of a synthetic resin material exhibiting high moldability and a sufficient mechanical strength, such as a polycarbonate resin. When the upper cartridge half 2 and the lower cartridge half 3 are abutted and bonded to each other to complete the main cartridge body unit 4, there is formed an upstanding wall constituting the peripheral wall section of the main cartridge body unit 4. The upper and lower cartridge halves 2, 3 are formed with arcuate position-setting wall sections on the facing inner sides so as to inscribe the upstanding wall sections making up the peripheral wall of the main cartridge body unit 4. When the upper and lower cartridge halves 2, 3 are abutted and connected to each other to form the main cartridge body unit 4, the position-setting wall sections make up a disc housing 6 for rotatably holding the optical disc 5.

The optical disc 5 held in the disc housing 6 is a phase-change optical disc having a recording capacity higher than that of the ordinary disc and signal recording surfaces on both sides and is made up of two disc substrates bonded together. On the signal recording layers, formed on both of the disc substrates, there are formed light transmitting layers of approximately 0.1 mm for operating as protective layers, with the entire thickness of the optical disc being 1.2 mm. The light-transmitting layers are designed as signal recording surfaces. The optical disc 5 is formed with a center opening 5a engaged by the disc table constituting the disc rotation unit. As for the signal recording surface of the optical disc 5, there is formed around the center opening 5a an inner non-recording area 5b for supporting the optical disc 5 by the disc table. On the outer rim side of the inner non-recording area 5b is formed a signal recording area 5c on the outer rim side of which is formed an outer non-recording area 5d to form the outer rim portion of the optical disc 5. The optical disc has its signal recording layer illuminated by a light beam from the optical pickup device so that the Ad signal recording layer has its crystal structure locally changed to record information signals. On the other hand, the return light from the signal recording layer has its light volume detected to reproduce the recorded information signals. The optical disc may also be such an optical disc one surface only of which is formed the signal recording surface.

The recording and/or reproducing apertures 7, 8, for exposing the optical disc 5 to outside, are formed so as to be substantially rectangular in contour and extended from the mid portions of the upper and lower surfaces of the main cartridge body unit 4, that is the upper and lower cartridge halves 2, 3, as far as the cartridge-inserting front surfaces 4a of the upper and lower cartridge halves 2, 3 carrying the shutter member 9, for exposing the portion of the optical disc 5 in the main cartridge body unit 4 extending from the outer rim to the center. This allows the optical pickup device to scan the optical disc 5 across its outer and inner rims and simultaneously allows the disc table of the disc rotation unit provided on the optical disc device adapted for rotationally driving the disc 5 to be intruded into the main cartridge body unit 4 to support the optical disc 5.

The recording and/or reproducing apertures 7, 8 are made up of circular apertures 7a, 8a for the disc table, provided centrally of the main cartridge body unit 4, and recording/reproducing apertures 7b, 8b formed in continuation to the apertures 7a, 8a for extending to the front surfaces of the main cartridge body unit 4 so as to be faced by the optical pickup device. The apertures 7a, 8a for the disc table are in register with the center opening 5a of the optical disc 5.

Figure 2:
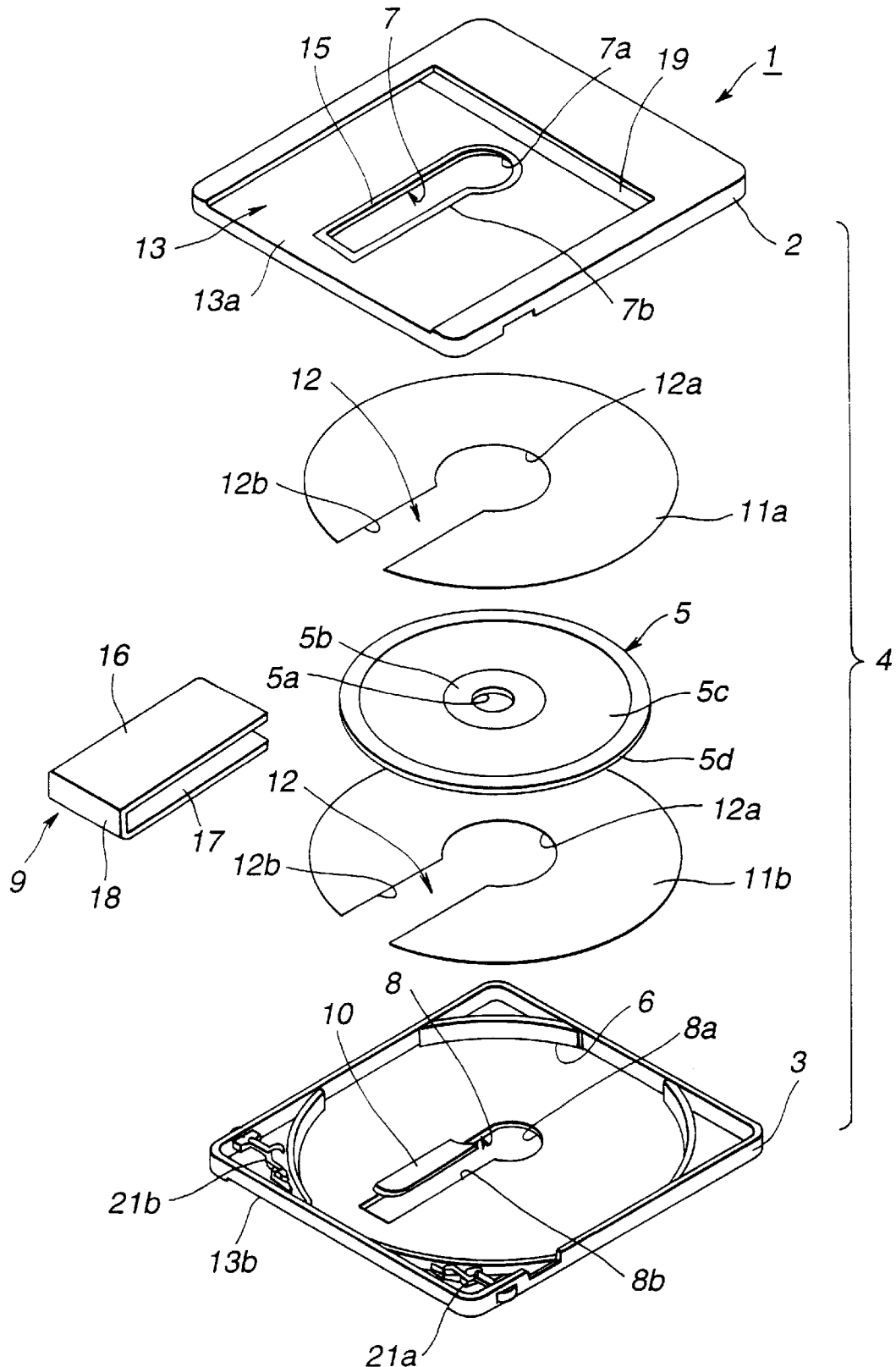
FIG. 2 is an exploded perspective view of the disc cartridge.
Figure 3:
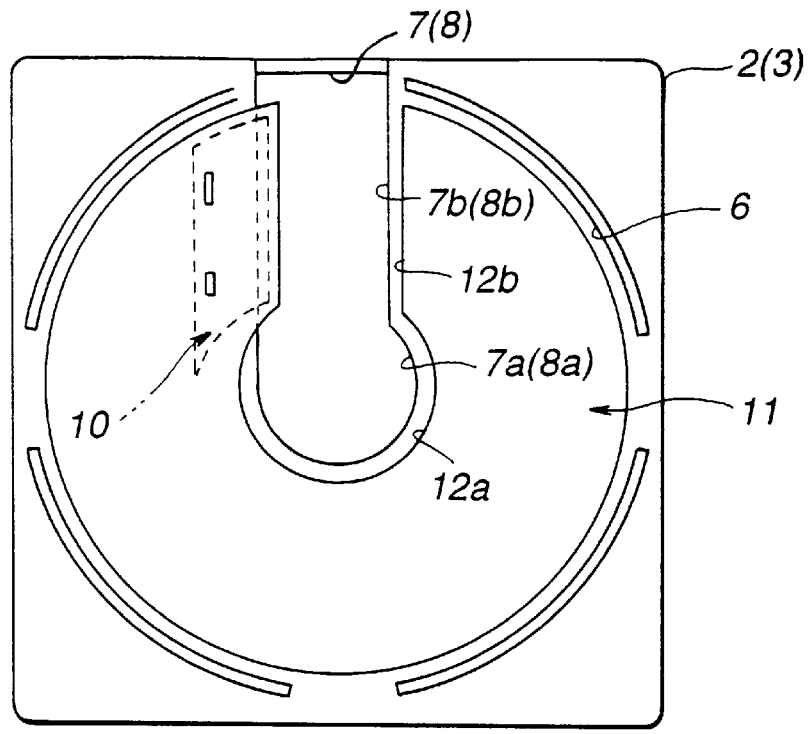
FIG. 3 is a plan view showing the mounting position of a cleaning sheet and a thrusting member used in the disc cartridge.

In the disc housing 6 are arranged cleaning sheets 11a, 11b for removing contaminants, such as dust and dirt, deposited on the signal recording surface of the optical disc 5, as shown in FIGS. 2 and 3. The cleaning sheets 11a, 11b are formed with cut-outs 12 extending from the outer rim portions to the center portions thereof in register with the apertures 7, 8 for exposing the signal recording area 5c of the optical disc 5 to these portions of the cleaning sheets 11a, 11b extending from the outer rim portions to the center portions.

Specifically, the apertures 12 of the cleaning sheets 11a, 11b are made up of cut-out portions 12a, 12a formed centrally of the cleaning sheets 11a, 11b so as to be larger than the apertures 7a, 8a for the disc table and recording/reproducing cut-out portions 12b, 12b formed in continuation to the cut-out portions 12b, 12b as far as the front side of the main cartridge body unit 4 so as to face the recording/reproducing apertures 7b, 8b. The cleaning sheets 11a, 11b are stuck to the inner surfaces of the upper and lower cartridge halves 2, 3 by an adhesive applied to the rims of the sheets.

Since the cleaning sheets 11a, 11b are of substantially the same size as the optical disc 5, there is generated an air stream in stabilized state between the sheets and the optical disc when the disc is run in rotation by the disc rotation unit to permit rotation of the optical disc 5 in a stabilized state within the disc housing 6. Meanwhile, it suffices if the cleaning sheets 11a, 11b are provided in the vicinity of the apertures 7, 8 if only the sheets are large enough to clean the signal recording area 5c of the optical disc 5.

Within the disc housing 6, there is provided, in the vicinity of the apertures 7, 8, a thrusting member 10 in each of the upper and lower cartridge halves 2, 3 for thrusting the cleaning sheets 11a, 11b against the signal recording area 5c of the optical disc 5, as shown in FIGS. 2 and 3. This thrusting member 10, punched from a metal sheet in the form of a spring plate, has its proximal end secured with an adhesive or a set screw to the inner surfaces of the upper and lower cartridge halves 2, 3 in the vicinity of the apertures 7, 8 and has its opposite end exposed in the apertures 7, 8 so as to be thrust by the thrusting unit of the optical disc device. Specifically, the free end side of the thrusting member 10 is formed so as to have a length at least substantially equal to the radial length of the signal recording area 5c to permit cleaning of the entire area of the signal recording area 5c of the optical disc.

The cleaning sheets 11a, 11b are brought into sliding contact with the signal recording area 5c of the optical disc only when the optical disc is run in rotation and the thrusting member 10 is thrust against the thrusting unit on the optical disc device, as later explained, in order to clean the signal recording area 5c of the optical disc 5. Thus, the cleaning sheets 11a, 11b are not perpetually thrust by the thrusting member 10 into contact with the optical disc 5. The cleaning sheets 11a, 11b are thrust by a thrusting member thrust by the thrusting unit of the optical disc device into sliding contact with the optical disc to clean the disc, only when the optical disc 5 is run in rotation and the thrusting member 10 is thus by the thrusting unit of the optical disc device, such as when a recording/reproducing error is detected, and when the optical disc is loaded in position. The result is that there is no risk of scratching of the signal recording surface of the optical disc 5.

The main cartridge body unit 4 is provided with a shutter movement area 13 in which is moved the shutter member 9 movably carried by the main cartridge body unit 4 and which is adapted to open or close the recording and/or reproducing apertures 7, 8 provided in the main cartridge body unit 4, as shown in FIGS. 1 and 2. This shutter movement area 13 is formed by recesses 13a, 13b formed in the front sides of the upper and lower cartridge halves 2, 3 in register with the movement area of the shutter member 9. These recesses 13a, 13b are of a depth corresponding to the thickness of the shutter portions closing the recording and/or reproducing apertures 7, 8, so that, when the shutter member 9 is mounted in position, the major surfaces of the upper and lower cartridge halves 2, 3 will be flush with the shutter portions to realize the reduced thickness. The shutter movement area 13 is provided to permit movement of the shutter member 9 in either directions with the position of the shutter member 9 closing the apertures 7, 8 as a reference position. Around the apertures 7, 8 of the shutter movement area 13 is fitted a buffer member 15 which is adapted to face the outer surfaces of the upper and lower cartridge halves 2, 3. The function of the buffer member 15 is to prevent intrusion of dust and dirt via the gap produced between the shutter member 9 and the outer surfaces of the upper and lower cartridge halves 2, 3 when the apertures 7, 8 are closed by the shutter member 9. The buffer member 15 is formed by a non-woven fabric having superior abrasion resistance, such as an ultrahigh-molecular polyethylene sheet or a sheet of polyethylene fluoride fibers, and operates to prevent intrusion into the main cartridge body unit 4 of contaminants occasionally produced as a result of contact of the shutter member 9 with the buffer member 15.

The shutter member 9, assembled in the shutter movement area 13 provided on the front side of the main cartridge body unit 4, closes the recording and/or reproducing apertures 7, 8 during non-use time when the disc cartridge 1 is not loaded on the respectively apparatus to prevent intrusion of dust and dirt via these apertures 7, 8 into the inside of the main cartridge body unit 4 for deposition on the surface of the optical disc 5, as shown in FIGS. 1 and 2. This shutter member 9 is formed by press-working a thin metal plate or a thin plastic sheet and is made up of a first shutter portion 16 and a second shutter portion 17 and a connecting portion 18 interconnecting the first shutter portion 16 and the second shutter portion 17, so that the shutter member 9 in its entirety is of a substantially U-shaped cross-section. The first shutter portion 16 and the second shutter portion 17 are of an outer profile and size sufficient to close the apertures 7, 8, as shown in FIG. 2.

The first and second shutter portions 16, 17 are formed in the form of rectangles dimensioned to be large enough the close the apertures 7, 8 of the upper and lower cartridge halves 2, 3 and the longer sides of which are extended in the fore-and-aft direction. The distal ends of the first and second shutter portions 16, 17 are supported by a shutter retention plate 19 mounted on the outer major surfaces of the upper and lower cartridge halves 2, 3 to prevent floating of the first and second shutter portions 16, 17 from the upper and lower cartridge halves 2, 3. The connecting portion 18 of the shutter member 9 has a height substantially equal to the thickness of the front surface of the main cartridge body unit 4.

With the shutter member 9, an engagement piece, not shown, provided on the inner lateral surface of the connecting portion 18, is engaged in an engagement groove formed in the front surface of the main cartridge body unit 4, so that the shutter member 9 can be moved along the front surface of the main cartridge body unit 4 in both directions, that is in the direction indicated by arrow A1 or A2 in FIG. 1, with the position closing the apertures 7, 8 as a reference position. That is, if the disc cartridge is inserted into the cartridge inserting/detachment opening with one of the major surfaces upwards, it is moved in the direction indicated by arrow A1 in FIG. 1, whereas, if the disc cartridge 1 is inserted in the cartridge inserting/detachment opening with the opposite side major surface upwards, it is moved in the direction indicated by arrow A2 in FIG. 1.

In order for the main cartridge body unit 4 to be moved in the direction indicated by arrow A1 or A2 in FIG. 1 only on loading of the shutter member 9 on the optical pickup device, the main cartridge body unit 4 is provided with a shutter lock mechanism 21a for limiting movement of the shutter member 9 in the direction indicated by arrow A1 in FIG. 1 and with a shutter lock mechanism 21b for limiting movement of the shutter member 9 in the direction indicated by arrow A2 in FIG. 1. These shutter lock mechanisms 21a, 21b are provided on both corners on the front surface of the main cartridge body unit 4. The shutter lock mechanism 21a is used only when the disc cartridge 1 is inserted into the cartridge inserting/detachment opening of the optical disc device with one of the major surfaces of the disc cartridge upwards, while the shutter lock mechanism 21b is used only when the disc cartridge 1 is inserted into the cartridge inserting/detachment opening of the optical disc device with the opposite side major surface of the disc cartridge upwards. Since the shutter lock mechanisms 21a, 21b are arranged symmetrically and of the same structure, these are explained hereinafter as a shutter lock mechanism 21.

Figure 4:
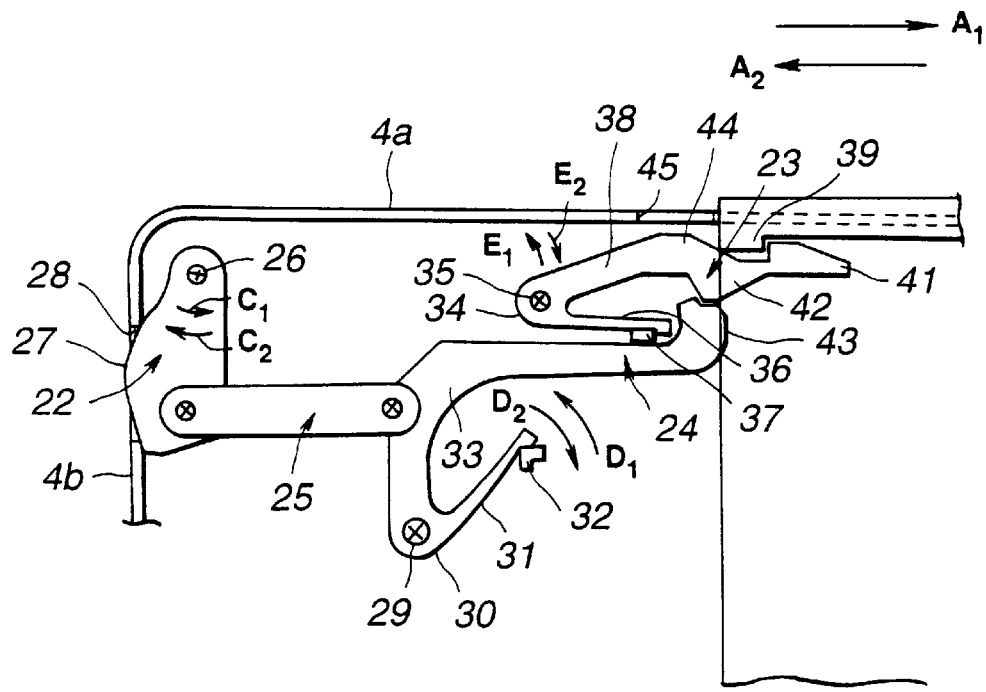
FIG. 4 is a plan view showing the status of a shutter lock mechanism during nonuse time of the disc cartridge.

Referring to FIG. 4, the shutter lock mechanism 21 is made up of a rotary member 22, rotated on being thrust, a lock member 23 for locking the shutter member 9 at the position of closing the apertures 7, 8, a control member 24 for limiting rotation of the lock member 23 and a connecting arm 25 interconnecting the rotary member 22 and the control member 24. The rotary member 22 is supported for rotation in the direction indicated by arrow C1 or C2 in FIG. 4 with a pivot 26 set upright on a front side corner of the main cartridge body unit 4 as the center of rotation, as shown in FIG. 4. This rotary member 22 is formed with a first thrust portion 27 on a lateral side 4b extending parallel to the inserting/detachment direction of the disc cartridge 1 and is exposed to outside via an opening 28 formed in the lateral surface 4b of the disc cartridge 1. The rotary member 22 is connected via connecting arm 25 to the control member 24. The connecting arm 25 has its both ends rotatably mounted on the rotary member 22 and on the control member 24. The lateral surface 4b of the disc cartridge 1, formed with an opening 28, is formed with a recessed guide 20 into which is intruded a first thrusting portion adapted for thrusting the first thrust portion 27 and which constitutes a shutter opening mechanism which will be explained subsequently.

The control member 24, connected to the rotary member 22 via connecting arm 25, has its proximal end 30 supported for rotation in the direction indicated by arrow D1 or D2 in FIG. 4, about the pivot 29 on the main cartridge body unit 4 as the center of rotation. This proximal end 30 is provided with a first elastic piece 31 which is retained by a retainer 32 provided on the main cartridge body unit 4 for biasing the control member 24 in the direction indicated by arrow D1 in FIG. 4. The proximal end 30 is provided with an arm 33 extending towards the connecting portion 18 of the shutter member 9.

The lock member 23 in its entirety is formed in the form of a letter C and has its proximal end 34 supported for rotation in the direction indicated by arrow E1 or E2 in FIG. 4 about a pivot 35 provided on the main cartridge body unit 4 as the center of rotation. This proximal end 34 has a second elastic piece 36 which is retained by a retainer 37 provided on the main cartridge body unit 4 to bias the lock member 23 in the direction indicated by arrow E1 in FIG. 4. the proximal end 34 is provided with a lock arm 38 for locking the shutter member 9. The distal end of the lock arm 38 is provided with a lock portion 41 retained by a projection 39 provided on a lateral edge of the connecting portion 18 of the shutter member 9. This lock portion 41 is retained by the projection 39 of the shutter member 9 by the second elastic piece 36 biasing the lock member 23 in the direction indicated by arrow E1 in FIG. 4. This lock arm 38 is provided in its mid portion towards the control member 24 with a protuberance 42 which is retained by a reception portion 43 provided on the distal end of the arm 33 of the control member 24. The control member 24, biased in the direction indicated by arrow D1 in FIG. 4, retains the protuberance 42 by the reception portion 43 to prohibit rotation of the lock member 23 in the direction indicated by arrow E2 in FIG. 4. The lock arm 38 is also provided with a second thrust portion 44 facing to the outside of an opening 45 formed in the front surface lying in the direction of movement of the shutter member 9. This second thrust portion 44 is rotated in the direction indicated by arrow E2 in FIG. 4 on being thrust to relinquish the state of retention of the lock portion 41 with the projection 39 of the shutter member 9.

When the recording and/or reproducing apertures 7, 8 are closed by the shutter member 9, the first elastic piece 31 of the control member 24 of the shutter lock mechanism 21 biases the control member 24 in the direction indicated by arrow C1 in FIG. 4. This rotates the first thrust portion 27 in the direction indicated by arrow C2 in FIG. 4 towards the opening 28 to expose the first thrust portion 27 to outside. On the other hand, the first elastic piece 31 biases the control member 24 in the direction indicated by arrow D1 in FIG. 4 to cause the reception portion 43 to thrust the protuberance 42 to prohibit rotation of the lock member 23 in the direction indicated by arrow E2 in FIG. 4. This exposes the second thrust portion 44 to outside via the opening 45. The lock portion 41 is retained by the projection 39 of the shutter member 9, whilst the lock member 23 is inhibited from rotating in the direction indicated by arrow E2 in FIG. 4. That is, during non-use time when the disc cartridge 1 is not loaded on the optical disc device, the shutter lock mechanism 21 keeps the shutter member 9 in the state of inhibiting opening the apertures 7, 8.

Figure 5:
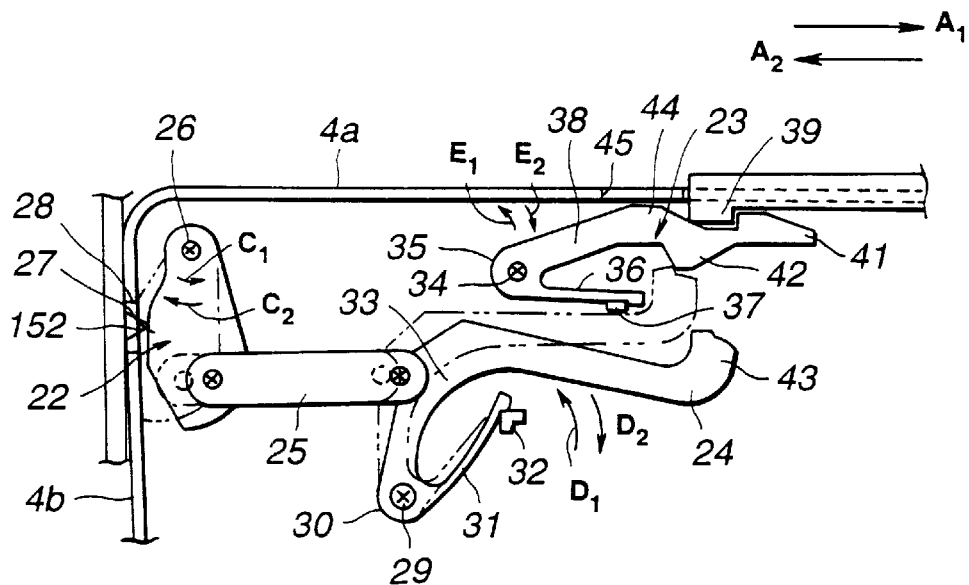
FIG. 5 is a plan view showing the status of the shutter lock mechanism when a first thrust portion of the disc cartridge is thrust.

If the disc cartridge 1 is inserted via the cartridge inserting/detachment opening of the optical disc device and held on a cartridge holder, the first thrust portion 27 of the shutter lock mechanism 21 is thrust by the first thrusting portion of the shutter opening mechanism provided on the optical disc device. This rotates the rotary member 22 in the direction indicated by arrow C1 in FIG. 5 to rotate the control member 24 via connecting arm 25 in the direction indicated by arrow D2 in FIG. 4 to relinquish the state of engagement of the protuberance 42 of the lock member 23 with the reception portion 43 of the control member 24 to liberate the lock member 23 from the thrusting by the control member 24. It is noted however that the lock portion 41 of the lock member 23 is kept retained by the projection 39 of the shutter member 9.

Figure 6:
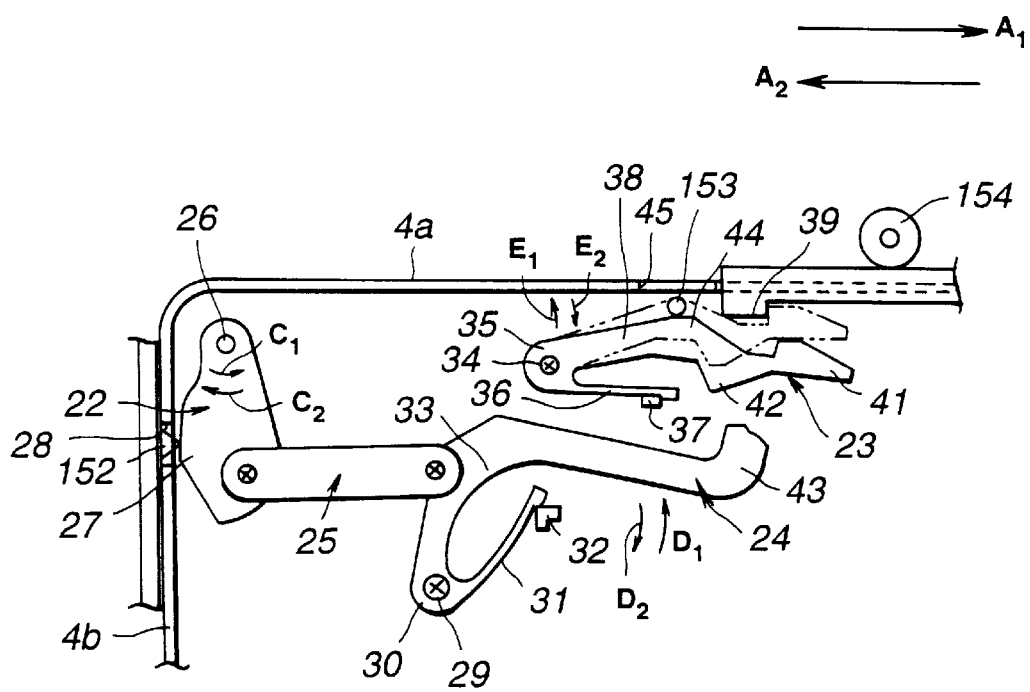
FIG. 6 is a plan view showing the status of the shutter lock mechanism when the first thrust portion and a second thrust portion of the disc cartridge are thrust.

When the disc cartridge 1 is loaded on the recording/reproducing unit of the optical disc adapted for recording and/or reproducing information signals, the second thrust portion 44 of the lock member 23 is thrust by the second thrusting portion of the shutter opening mechanism, as shown in FIG. 6. This rotates the lock member 23 in the direction indicated by arrow E2 in FIG. 6 to relinquish the state of retention of the lock portion 41 of the lock member 23 and the projection 39 of the shutter member 9. The shutter member 9 is moved in the direction indicated by arrow A1 or A2 in FIGS. 1 and 6 by the shutter actuating unit of the shutter opening mechanism provided on the optical disc device.

When ejecting the disc cartridge 1 from the optical disc device, the shutter member 9, moved in the direction indicated by arrow A1 or A2 in FIG. 6, is first moved by the shutter actuating unit provided on the optical disc device as far as the reference position of closing the recording and/or reproducing apertures 7, 8. By relinquishment of the thrusting state of the second thrust portion 44, the lock member 23 is rotated in the direction indicated by arrow E1 in FIG. 5 so that the lock portion 41 of the lock member 23 is engaged with the projection 39 of the shutter member 9. If then the thrusting state of the first thrust portion 27 is annulled, the control member 24 is rotated in the direction indicated by arrow D1 in FIG. 4 so that the reception portion 43 is engaged with the protuberance 42 to inhibit rotation of the lock member 23 in the direction indicated by arrow E2 in FIG. 4. This locks the shutter member 9 by the shutter lock mechanism 21 in the state of closing the recording and/or reproducing apertures 7, 8.

On the opposite side to the inserting end of the main cartridge body unit 4 into the optical disc device, there is provided, in its major surface, a discriminating unit 46 for discriminating the specifications of the optical disc 5, such as the sort of the optical disc 5, recording time and whether the optical disc has a signal recording surface on its sole major surface or on each major surface. This discriminating unit 46 is made up of plural discriminating recesses 47 which, when the disc cartridge 1 is loaded on the optical disc device, discriminates the specifications of the disc cartridge 1 by a discriminating mechanism provided on the optical disc device in association with the discriminating unit 46. Specifically, the discriminating unit 46 discriminates between an off-state in which a thrusting type discriminating pin provided on the optical disc device is fitted in the discriminating recesses 47 without being thrust, and an on-state in which there are provided no discriminating recesses 47 so that the discriminating pin is thrust.

On the opposite side to the inserting end of the main cartridge body unit 4 into the optical disc device, there is provided, in its major surface, a mistaken recording inhibiting mechanism 51 adapted for inhibiting inadvertent recording of information signals on the optical disc 5, as shown in FIG. 1. This mistaken recording inhibiting mechanism 51 includes a mistaken recording inhibiting member 52 movable between a first position of inhibiting mistaken recording of information signals on the optical disc 5 and a second position of permitting recording of information signals. The mistaken recording inhibiting mechanism 51 also includes a discriminating hole closed by the mistaken recording inhibiting member 52 in the second position and an opening 53 for exposing an actuating portion of the mistaken recording inhibiting member 52 to outside. In the second position in which the mistaken recording inhibiting member 52 is moved to close the discriminating hole, the mistaken recording inhibiting mechanism 51 prohibits detection means provided on the optical disc device from being intruded into the discriminating hole to enable recording of information signals on the optical disc. When the mistaken recording inhibiting member 52 is moved to the first position of opening the discriminating hole, the detection means provided on the optical disc device is intruded into the discriminating hole to disable recording of information signals on the optical disc 5.

The main cartridge body unit 4 is also provided on both lateral sides 4b of the disc cartridge 1 parallel to the inserting/detachment direction for the optical disc device with loading cut-outs 54, 55 engaged by a loading mechanism adapted for loading the disc cartridge 1 on a recording/reproducing unit provided in the optical disc for recording and/or reproducing information signals. These loading cut-outs 54, 55 are provided through the upper cartridge half 2 and the lower cartridge half 3 in the lateral sides 4b of the main cartridge body unit 4.

If the above-described disc cartridge 1 is inserted via the cartridge inserting/detachment opening of an optical disc device configured for recording and/or reproducing the optical disc 5, the disc cartridge 1 is held by the cartridge holder. At this time, the loading mechanism provided on the optical disc device is engaged with the loading cut-outs 54, 55, at the same time as the first thrust portion 27 of the shutter lock mechanism 21 provided on the lateral side 4b of main cartridge body unit 4 is thrust by the shutter opening mechanism provided on the optical disc device.

When the disc cartridge 1 is loaded on the recording/reproducing unit adapted for recording and/or reproducing the optical disc 5, the second thrust portion 44 of the shutter lock mechanism 21 is thrust by the shutter opening mechanism, as shown in FIG. 6. This relinquishes the state of engagement between the reception portion 43 of the control member 24 and the protuberance 42 of the lock member 23 and the state of retention between the lock portion 41 of the lock member 23 and the projection 39 of the shutter member 9.

The shutter member 9 is enabled to be moved in the direction indicated by arrow A1 or A2 in FIGS. 1 and 6 by the shutter actuating unit of the shutter opening mechanism provided on the optical disc device. The shutter member 9 is moved by the shutter actuating unit in the direction indicated by arrow A1 or A2 in FIG. 1 to open the apertures 7, 8 only in case of recording or reproducing the optical disc 5 or in case of track jump, that is when the optical pickup device is to be in use. That is, the recording and/or reproducing apertures 7, 8 are kept closed by the shutter member 9 if the optical disc device in the non-operating state even although the disc cartridge 1 is loaded on the recording/reproducing unit.

Also, with the present disc cartridge 1, the optical disc 5 is cleaned only when the shutter member 9 is actuated for opening the shutter member 9 at the time of loading and detection of recording/reproducing errors, with the disc cartridge being in the loaded state on the recording/reproducing unit. Specifically, in the disc cartridge 1 the information recording surface of the optical disc 5 is contacted by the cleaning sheets 11a, 11b being thrust by the thrusting member 10 and a thrusting mechanism provided on the optical disc device against the signal recording surface of the optical disc 5 during loading or on detection of recording/reproducing errors, so that the cleaning sheets 11a, 11b are contacted by the optical disc 5 which is run in rotation by the disc rotation unit.

Since the shutter member 9 is moved to open the apertures 7, 8 of the disc cartridge only on the minimum number of necessary occasions such as when the optical disc is recorded or reproduced or in case of track jumping, there is no risk of intrusion of foreign matter, such as dust and dirt, into the disc housing 6 of the main cartridge body unit 4.

Since the signal recording surface of the optical disc is cleaned by the cleaning sheets 11a, 11b only at the time of detection of recording/reproducing errors or of loading of the disc cartridge on the recording/reproducing unit, directly before starting of the recording or reproduction of the optical disc 5, it is possible to prevent possible scratching of the signal recording surface of the optical disc.

Figure 7:
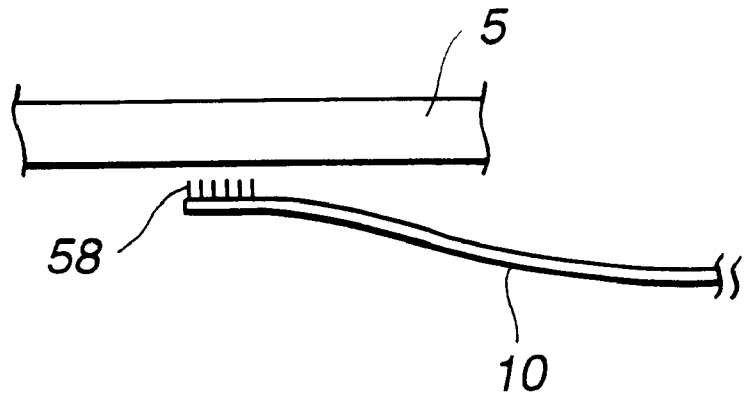
FIG. 7 is a schematic side view showing the status in which a cleaning brush is used at the distal end of a biasing member in place of the cleaning sheet.
Figure 8:
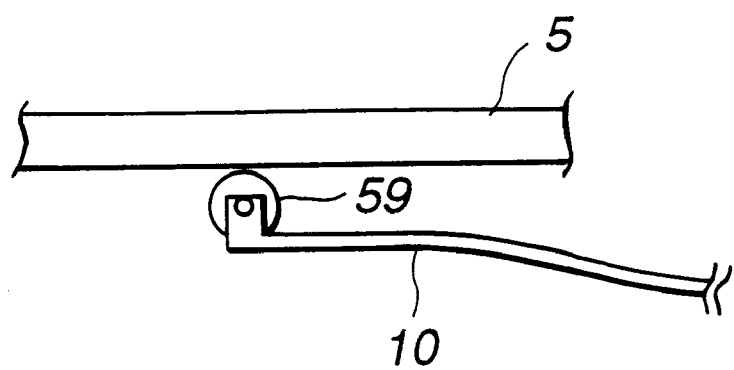
FIG. 8 is a schematic side view showing the status in which a cleaning roll is used at the distal end of a biasing member in place of the cleaning sheet.

Although the case of using the cleaning sheets 11a, 11b for the cleaning unit adapted for cleaning the signal recording surface of the optical disc 5 has been described in the foregoing, the cleaning unit may be configured as shown in FIGS. 7 and 8. That is, a cleaning brush 58 sized to be at least equal to the radial length of the signal recording area 5c may be provided on the distal end of the thrusting member 10 in order to permit cleaning of the entire area of the signal recording area 5c of the optical disc 5. The brush 58 used is selected to be superior in abrasion resistance in order to prevent the foreign matter such as dust and dirt from being produced as a result of sliding contact of the brush 58 with the optical disc 5.

Alternatively, a cleaning roll 59 sized to be at least equal to the radial length of the signal recording area 5c may be provided on the distal end of the thrusting member 10 in order to permit cleaning of the entire area of the signal recording area 5c of the optical disc 5. The roll 59 used is formed of an elastic material superior in abrasion resistance, such as expanded plastics material, in order to prevent the foreign matter such as dust and dirt from being produced as a result of sliding contact of the brush 58 with the optical disc 5.

Figure 9:
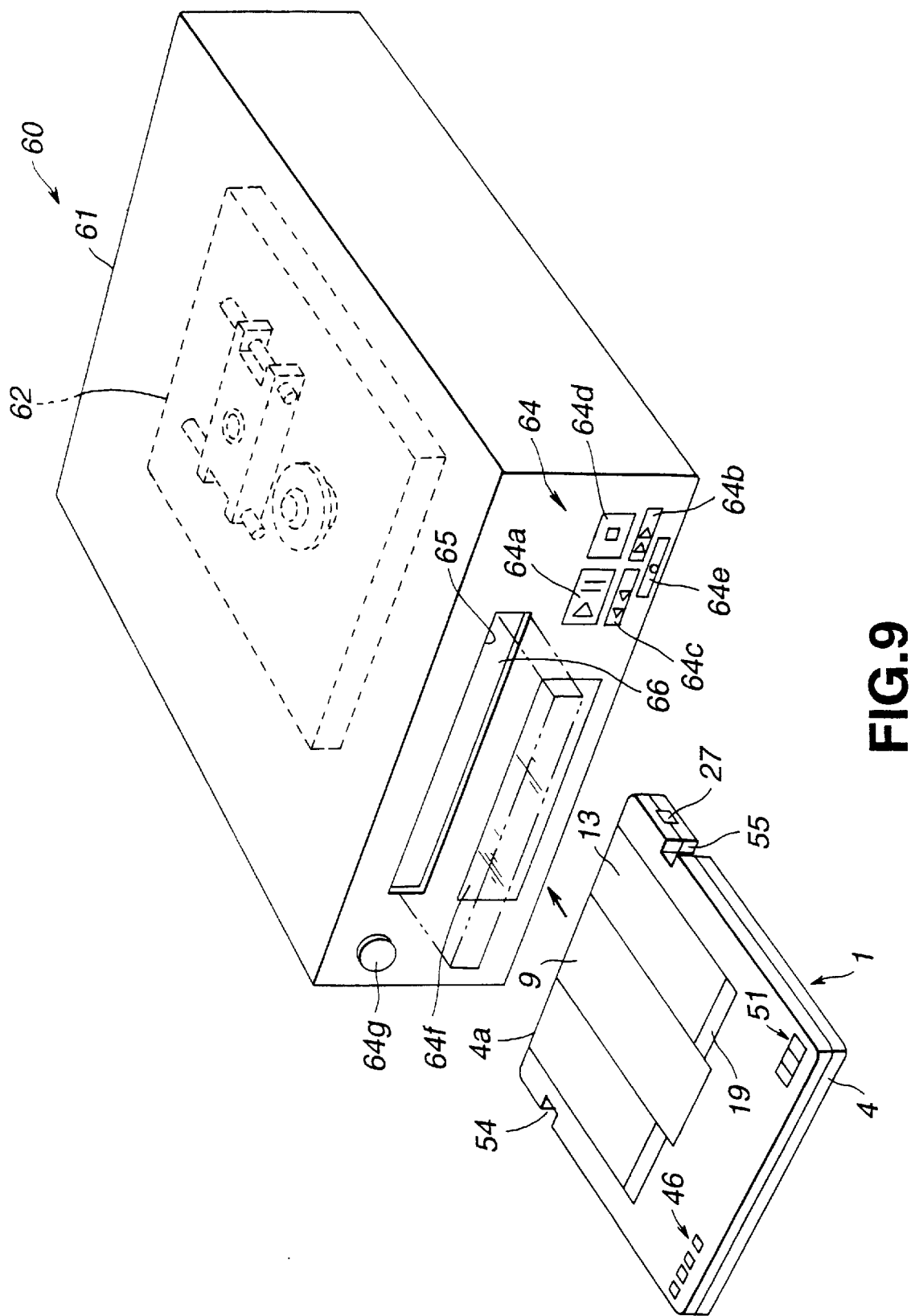
FIG. 9 is a perspective view showing an overall structure of an optical disc device.

An optical disc device for recording and/or reproducing the optical disc 5 using the above-described disc cartridge 1 is now explained. Referring to FIG. 9, this optical disc device includes, in the inside of a main body portion of the optical disc device, a recording/reproducing unit 62 adapted for recording and/or reproducing the optical disc 5 contained in the disc cartridge 1. On the front side of the main body portion 61, there is provided an actuating unit 64 having plural actuating buttons for actuating the main body portion 61. This actuating unit 64 is made up of a playback start button 64a, for initiating the reproduction of information signals recorded on the optical disc 5 of the disc cartridge 1 loaded on the recording/reproducing unit 62, a forward direction track jump button 64c, for effectuating track jump in the forward direction, a reverse direction track jump button 64c, for effectuating track jump in the reverse direction, a recording start button 64d for recording information signals on the optical disc 5, a stop button 64e for stopping the reproduction or recording, a display unit 64f formed by a liquid crystal display device for displaying addresses of the information signals during reproduction, and a power source button 64g of the main body portion 61. This actuating unit 64 is; also provided with a cartridge inserting/detachment opening 65 for insertion or detachment of the disc cartridge 1. This cartridge inserting/detachment opening 65 is an opening slightly larger than the lateral surface 4a operating as an inserting end to the optical disc device 60 of the disc cartridge 1.

This cartridge inserting/detachment opening 65 is provided with a rotary lid 66 in order to prohibit intrusion of foreign matter, such as dust and dirt, from outside into the recording/reproducing unit 62. This lid 66 is sized to be large enough to close the cartridge inserting/detachment opening 65. When the disc cartridge is inserted via the cartridge inserting/detachment opening 65, the lid 66 is thrust and rotated by the lateral side 4a of the disc cartridge 1 to permit loading of the disc cartridge into the recording/reproducing unit 62.

Figure 10:
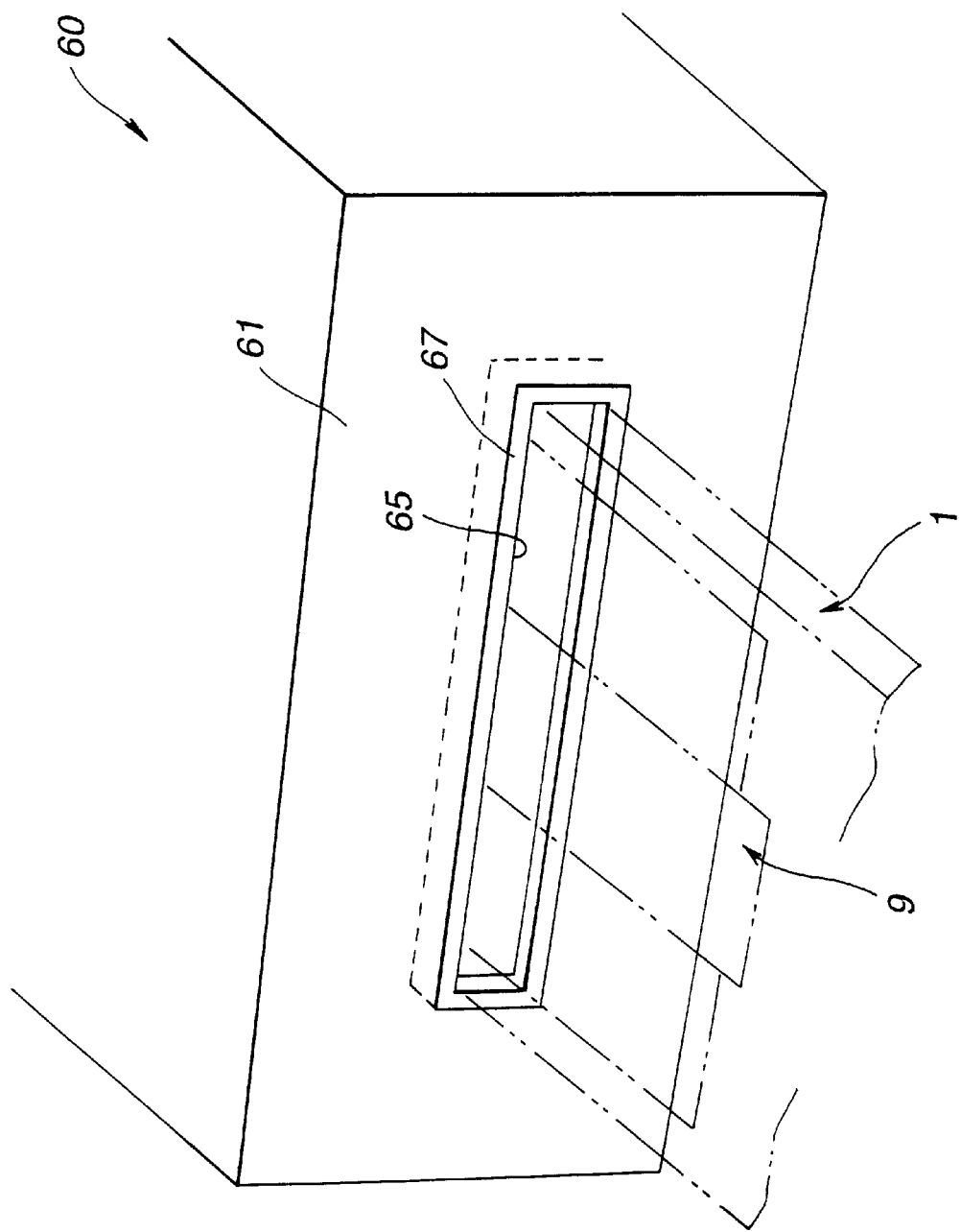
FIG. 10 is a schematic perspective view for illustrating a cartridge inserting/detachment opening for insertion/detachment of the disc cartridge.

Around the cartridge inserting/detachment opening 65, a cleaning member 67 for cleaning the outer surface of the disc cartridge 1 is provided, as shown in FIG. 10. This cleaning member 67 is formed by a non-woven fabric having superior abrasion resistance, such as an ultra-high-molecular polyethylene sheet or a sheet of polyethylene fluoride based fibers. When the disc cartridge is inserted inti the cartridge inserting/detachment opening 65, the cleaning member 67 is contacted with the outer surface of the disc cartridge 1 to wipe off the foreign matter, such as dust and dirt or fingerprints, affixed to the outer surface of the disc cartridge 1. This prevents intrusion of foreign matter affixed to the outer surface of the disc cartridge into the inside of the recording/reproducing unit 62, such that, when the recording and/or reproducing apertures 7, 8 are opened by the shutter member 9, it is possible to prevent the foreign matter from intruding into the disc housing 6 or from becoming affixed to, for example, the objective lens of the optical pickup device.

If the disc cartridge 1 is inserted a defined amount via cartridge inserting/detachment opening 65 by hand or finger, with the lateral side towards the front surface of the disc cartridge 1 as an inserting end, the disc cartridge 1 inserted by a loading mechanism 76 up to the recording/reproducing unit 62. When ejecting the disc cartridge 1 from the recording/reproducing unit 62, the disc cartridge 1 is loaded by the loading mechanism until the disc cartridge is projected a defined amount from the cartridge inserting/detachment opening 65, and is then taken out by hand or finger from the main body portion 61.

Figure 11:
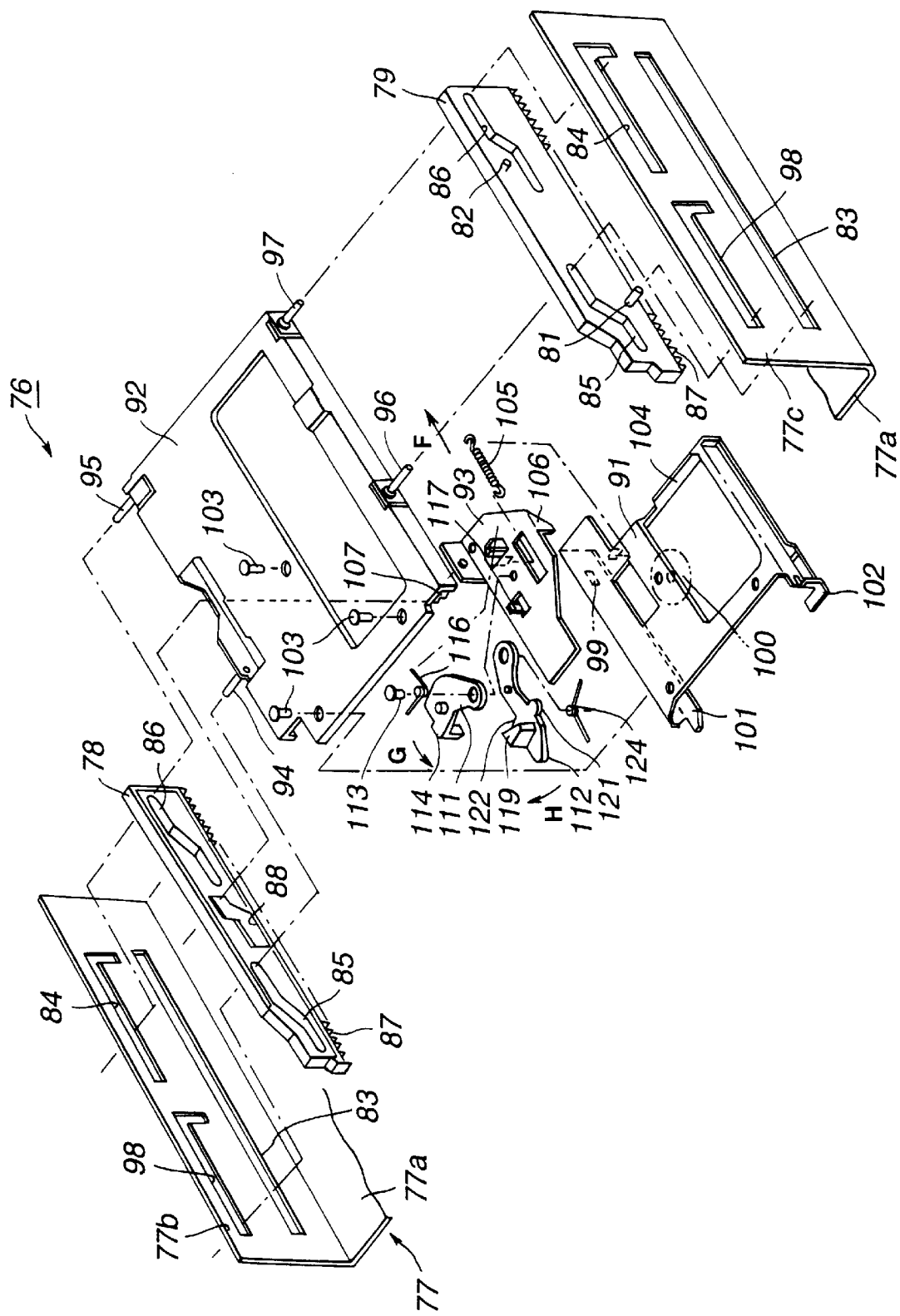
FIG. 11 is an exploded perspective view of a loading mechanism of the disc cartridge.
Figure 12:
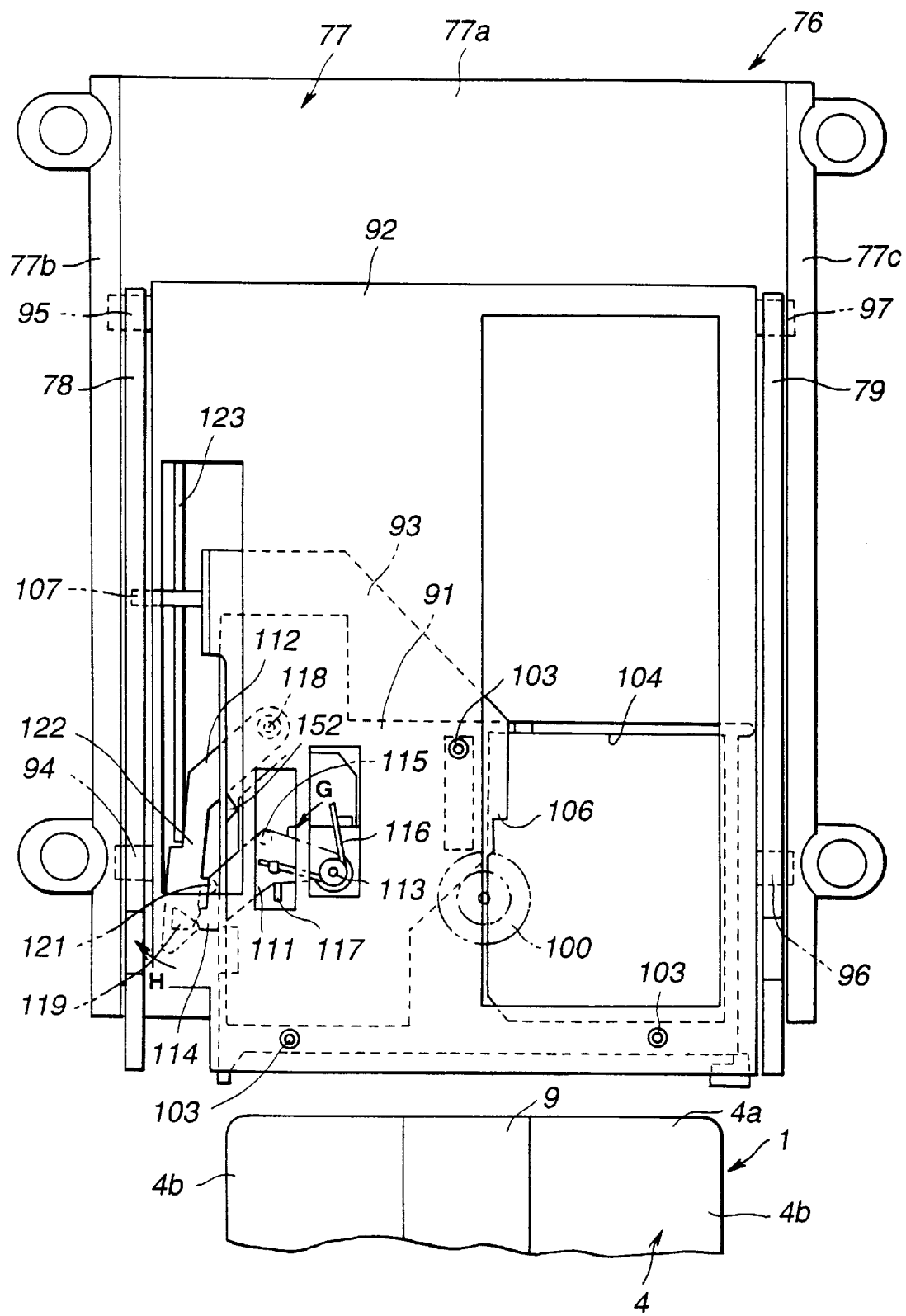
FIG. 12 is a plan view for illustrating a loading mechanism for the disc cartridge.
Figure 13:
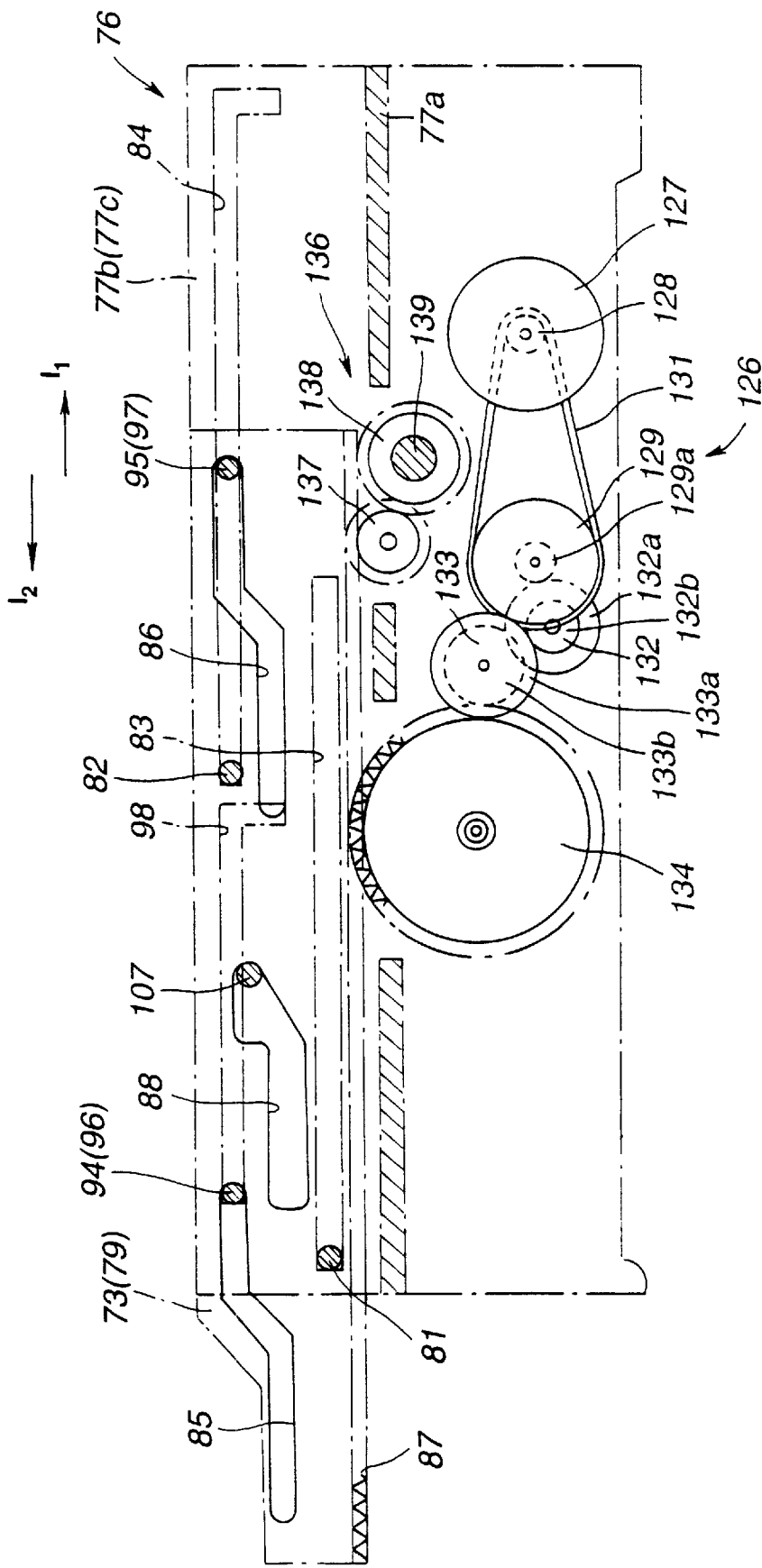
FIG. 13 is a side view for illustrating the loading mechanism.

The loading mechanism 76 for the disc cartridge 1 includes cam plates 78, 79 slidably supported by sidewall sections 77b, 77c mounted upright on a bottom surface section 77a of a chassis 77 and which extend parallel to the inserting/detachment direction of the disc cartridge, as shown in FIGS. 11 to 13. The bottom surface section 77a of the chassis, fixedly carrying the casing of the main body portion 61, is mounted parallel to the bottom surface of the main body portion 61. The cam plates 78, 79 are supported by the sidewall sections 77b, 77c by engagement of supporting pins 81, 82 adapted for supporting the cam plates 78, 79 for movement relative to the sidewall sections 77b, 77c with first sand second supporting slits 83,84 provided in the sidewall sections 77b, 77c. The first supporting slit 83 is formed linearly from the forward ends to the mid portions of the sidewall sections 77b, 77c, while the second supporting slit 84 is formed linearly from the mid portions of the sidewall sections 77b, 77c to the rear end of the main body portion 61, and has its rear end warped downwards at a right angle.

The cam plates 78, 79 are formed with cam grooves 85, 86 in association with the front and back sides of the main body portion 61. The forward side cam groove 85 on the front side of the main body portion 61 has a forward side horizontal section, a backward side horizontal section, at a higher level than the forward side horizontal section, and an inclined section interconnecting these horizontal sections. The backward side cam groove 86 on the rear side of the main body portion 61 is contoured similarly to the forward side cam groove 85 and has a forward side horizontal section, a backward side horizontal section and an inclined section interconnecting these horizontal sections. Each of the cam plates 78, 79 has a rack gear 87 for causing movement of the cam plates 78, 79 along the movement direction of the disc cartridge 1. The rack gear 87 is formed on the lower edge of each of the cam plates 78, 79 for extending from the forward end to the rear end of the cam plate. The cam plate 78 is also formed with an engagement opening 88 between the cam grooves 85, 86. This engagement opening 88 has its longitudinal direction coincident with the movement direction of the cam plate 78 and has its rear end formed as an inclined section in association with the inclined section of each of the cam grooves 85, 86.

Referring to FIG. 11, there are provided, between the cam plates 78 and 79, a cartridge holder 91 for holding the disc cartridge 1, an actuating plate 92 connected to the cartridge holder 91 and which rotationally drives the cartridge holder 91, and a slider plate 93 arranged between the cartridge holder 91 and the actuating plate 92.

The actuating plate 92 is of substantially the same size as the bottom surface section 77a of the chassis 77. On the lateral surfaces of the actuating plate 92 parallel to the cam plates 78, 79, there are provided left and right paired supporting pins 94, 95, 96 and 97. The forward side supporting pins 94, 94 are engaged in forward side cam grooves 85 of the cam plates 78, 79 and in third slits 98 formed in the sidewall sections 77b, 77c of the chassis 77, as shown in FIGS. 11 and 13. These third slits 98 are formed linearly from the front sides to the mid portions of the sidewall sections 77b, 77c and are warped downwards at the rear ends thereof. The rear side supporting pins 95, 97 are engaged in rear cam grooves 60 of the cam plates 78, 79 and are further engaged in second supporting slits 84 formed in the sidewall section 77b of the chassis 77.

Specifically, the actuating plate 92 is supported by the sidewall sections 77b, 77c via the supporting pins 94, 95, 96 and 97 for movement in the fore-and-aft direction corresponding to the disc cartridge inserting/detachment direction. If the cam plates 78, 79 are moved in the fore-and-aft direction, the actuating plate 92 is moved in the disc cartridge inserting/detachment direction along the third slits 98 and the second supporting slits 84 provided in the sidewall sections 77b, 77c. When the supporting pins 94, 95, 96 and 97 are positioned at the rear ends of the third slits 98 and the second supporting slits 84, the actuating plate 92 is lowered, that is moved in a direction approaching the bottom surface section 77a of the chassis 77.

The cartridge holder 91 has its front side towards the cartridge inserting/detachment opening 65 of the main body portion 61 opened for holding the disc cartridge 1 and is provided on its both lateral sides with substantially U-shaped cartridge holding sections 101, 102, as shown in FIG. 11. The cartridge holder 91 is provided below the actuating plate 92. The cartridge holder 91 is supported and suspended by set screws 103 by the actuating plate 92 at left and right sides and a mid portion of the actuating plate 92. That is, the cartridge holder 91 can be moved in the up-and-down direction a length of the order of the length of the set screws.

On the rear side edge of the cartridge holder 91, there is provided a cartridge positioning wall section 104 formed by warping the rear edge of the major surface of the cartridge holder 91 downwards. When the disc cartridge is inserted, the front side of the disc cartridge is abutted against the cartridge positioning wall section 104. At a mid portion of the major surface of the cartridge holder 91, a disc-shaped damper 100 is rotatably mounted which clamps the optical disc in cooperation with the disc table of the rotation driving unit to run the optical disc in rotation. This damper 100 is mounted for rotation at a position facing the disc rotation unit when the cartridge holder 91 is moved in a direction of approaching to the disc rotation unit. The damper 100 is formed of a magnetic material and is of a disc shape substantially corresponding to the disc table 144 on which to load the optical disc 5. The cartridge holding section 101 is provided with a first thrusting unit 152 constituting a shutter opening mechanism thrusting the first thrust portion 27 of the shutter lock mechanism 21 adapted for locking the shutter member 9 of the disc cartridge 1 in the recording and/or reproducing aperture closing position when the disc cartridge 1 is inserted into the cartridge holder 91.

The slider plate 93 is arranged between the cartridge holder 91 and the actuating plate 92 for sliding a predetermined distance in the fore-and-aft direction by the upper surface of the cartridge holder 91. A coil spring 105 is retained by a retainer provided at back of the slider plate 93 and another retainer, not shown, provided on the rear edge of the cartridge holder 91, as shown in FIG. 11, so that the slider plate 93 is biased rearwardly relative to the cartridge holder 91 in the direction indicated by arrow F in FIG. 11. Thus, the cartridge holder 91 and the actuating plate 92 mounted thereon are biased forwardly of the main body portion 61 which is the opposite direction to the direction indicated by arrow F in FIG. 11.

On the slide plate 93 towards the cam plate 79 is mounted a thrust piece 106 which is thrust by abutment by the lateral side 4a towards the front surface of the disc cartridge 1 for being thrust inwards. In an initial state in which the slider plate 93 is positioned forwardly of the cartridge holder 91 against the bias of the coil spring 105, the thrust piece 106 is positioned more forwardly than the cartridge positioning wall section 104, such that, when the slider plate 93 is moved to rearwardly of the cartridge holder 91, the thrust piece 106 is moved to a position flush with the cartridge positioning wall section 104. Towards the cam plate 78, the slide plate 73 is provided with an upstanding section from the major surface of the slider plate 93. On the upstanding section is formed a supporting protrusion 107 which is engaged in an engagement opening 88 formed in the cam plate 78.

On the slider plate 93, there are rotatably mounted a cartridge detection arm 111 for detecting the insertion of the disc cartridge 1 into the cartridge holder 91 and a loading arm 112 for loading the disc cartridge 1 to the recording/ reproducing unit 62, as shown in FIGS. 11 and 12. The cartridge detection arm 111 has its proximal end supported for rotation about a mounting pin 113 as the center of rotation. The cartridge detection arm 111 has an abutment portion 114 on its distal end for abutting against the loading arm 112. This abutment portion 114 is protruded to a position between the cartridge holder 91 and the cam plate 78. The cartridge detection arm 111 has at its mid portion a cartridge abutment pin 115 on which is abutted the lateral surface 4a on the front side of the disc cartridge 1 and which is protruded towards the inside of the cartridge holder 91.

The cartridge detection arm 111 is biased in the direction indicated by arrow G in FIGS. 10 and 11, by having one end of a torsion coil spring 116 on the mounting pin 113 retained by a retainer provided on the slider plate 30 and by having its opposite end retained by another retainer provided on the slider plate 30, so that the cartridge abutment pin 115 is positioned ahead of the cartridge holder 91. The cartridge detection arm 111 is positioned at the initial position compressing against a positioning piece 117 provided on the slider plate 93.

The loading arm 112 has the proximal end rotatably supported with a mounting pin 118 as the center of rotation. On the mounting pin 118 of the loading arm 112 is mounted a torsion coil spring 124 so that the loading arm 112 is biased outwardly of the cartridge holder 91, that is, in the direction indicated by arrow H in FIGS. 11 and 12. The distal end of the loading arm 112 is provided with an upwardly directed abutment protrusion 119 which is abutted against the abutment portion 114 of the cartridge detection arm 111. The abutment protrusion 119 is abutted against the abutment portion 114 of the cartridge detection arm 11 Ito prevent the loading arm 112 from being rotated towards the inside of the cartridge holder 91.

The loading arm 112 is also provided with an engagement portion 121 engaged in the loading cut-outs 54, 55 provided in the lateral side 4b extending along the inserting/ detachment direction of the disc cartridge 1 towards the cartridge holder 91. Towards the cam plate 78, a retention portion 122 is formed on the loading arm 112. This retention portion 122 is retained by the forward side lateral edge of a stop wall section 123 set upright on the bottom surface section 77a of the chassis 77, as shown in FIG. 12, in order to prohibit the slider plate 93 and the actuating plate 92 from being moved rearwardly of the main body portion 61.

On the sidewall section 77b of the chassis 77, there is provided a driving unit for loading 126 for causing movement of the cam plates 78, 79 in the inserting/detachment direction of the disc cartridge 1, as shown in FIG. 13. This driving unit for loading 126 includes a loading motor 127, as a driving source, a driving pulley 128 mounted on a driving shaft of the loading motor 127, a follower pulley 129 having a gear 129a, and an endless belt 131 for interconnecting the driving pulley 128 and the follower pulley 129. The driving unit for loading 126 also includes a first transmission gear 132 having a large-diameter gear 132a meshing with a gear 129a of the follower pulley 129 and a small-diameter gear 132b, a second transmission gear 133 having a large-diameter first gear 133a meshing with the second gear 132b and a small-diameter second gear 132b and a driving gear 134 meshing with the first gear 133a of the second transmission gear 133 and with a rack gear 87 of the cam plate 78. If the loading motor 127 is run in the forward direction or in the reverse direction, the driving unit for loading 126 causes movement of the cam plate 78 in the direction indicated by arrow $I_1$ in FIG. 13 or in the direction indicated by arrow $I_2$ in FIG. 13, respectively.

The cam plate 78 and the cam plate 79 are interconnected via a transmission mechanism 136 provided on the sidewall sections 77b, 77c, as shown in FIG. 13. This transmission mechanism 136 includes a driving transmission gear 137 meshing with the rack gear 87 of the cam plate 78, a counter gear 138 meshing with the driving transmission gear 137, a connecting shaft 139 operating as a rotary shaft for the counter gear 138 and mounted across the cam plates 78, 79 and a counter gear, not shown, mounted on the connecting shaft 139 towards the cam plate 79 and which is engaged with the rack gear 87 provided on the cam plate 79. Thus, if the loading motor 127 is run in rotation, the transmission mechanism 136 causes movement of the cam plate 79 in synchronism with the cam plate 78.

The operation of the loading mechanism 76 for the disc cartridge 1 is hereinafter explained. First, if the disc cartridge 1 has not been loaded via the cartridge inserting/ detachment opening 65, the cam plates 78, 79 are positioned at the initial state in which the cam plates 78, 79 are on the forward side of the main body portion 61, as shown in FIGS. 12 and 13. At this time, the forward side supporting pins 94, 96 of the actuating plate 92 are at the rear side of the forward side cam grooves 95 of the cam plates 78, 79 and are positioned at the forward side ends of the supporting slits 98 formed in the sidewall sections 77b, 77c of the chassis 77. The rear side supporting pins 95, 97 of the cam plates 78, 79 are at the rear ends of the rear side cam grooves 86 of the cam plates 78, 79 and are positioned at mid portions of the second supporting slits 84 provided in the sidewall sections 77b, 77c. The supporting protrusion 107 of the slider plate 93 compresses against the rear end of the engagement opening 88 of the cam plate 78 for positioning the slider plate 93 on the forward side of the cartridge holder 91. Thus, the loading arm 112 has its retention portion 122 retained by the foremost part of the stop wall section 123 provided upright on the bottom surface section 77a of the chassis 77 in order to prohibit the slider plate 93 and the actuating plate 92 from being moved towards the rear side of the main body portion 61. The loading arm 112 is prohibited from being rotated towards the interior of the cartridge holder 91 by abutment of the abutment protrusion 119 against the abutment portion 114 of the cartridge detection arm 111.

When the disc cartridge 1 is inserted via the cartridge inserting/detachment opening 65 with the lateral side 4a having the built-in shutter member 9 as an inserting end, the disc cartridge 1 thrusts the cartridge abutment pin 115 by the lateral side 4a in order to rotate the cartridge detection arm 111 towards the back side of the cartridge holder 91 against the bias of the torsion coil spring 116. At this time, the loading arm 112 is released from its state in which the abutment portion 114 compresses against the abutment protrusion 119 of the cartridge detection arm 111 so that the loading arm 112 can be rotated towards the inside of the cartridge holder 91. The lateral side 4a on the front side of the disc cartridge 1 compresses against the thrust piece 106 of the slider plate 93.

If the disc cartridge 1 is thrust towards the inside of the main body portion 61, the rear ends of the engagement openings 88 of the cam plates 78, 79 are thrust by the supporting protrusion 107 of the slider plate 93 and thereby moved slightly rearwards. This causes slight unidirectional rotation of the driving gear 134 meshing with the rack gear 87 of the cam plate 78. The rotation of the driving gear 134 is detected by a sensor, not shown, with the loading motor 127 being run in rotation in the forward direction.

Figure 14:
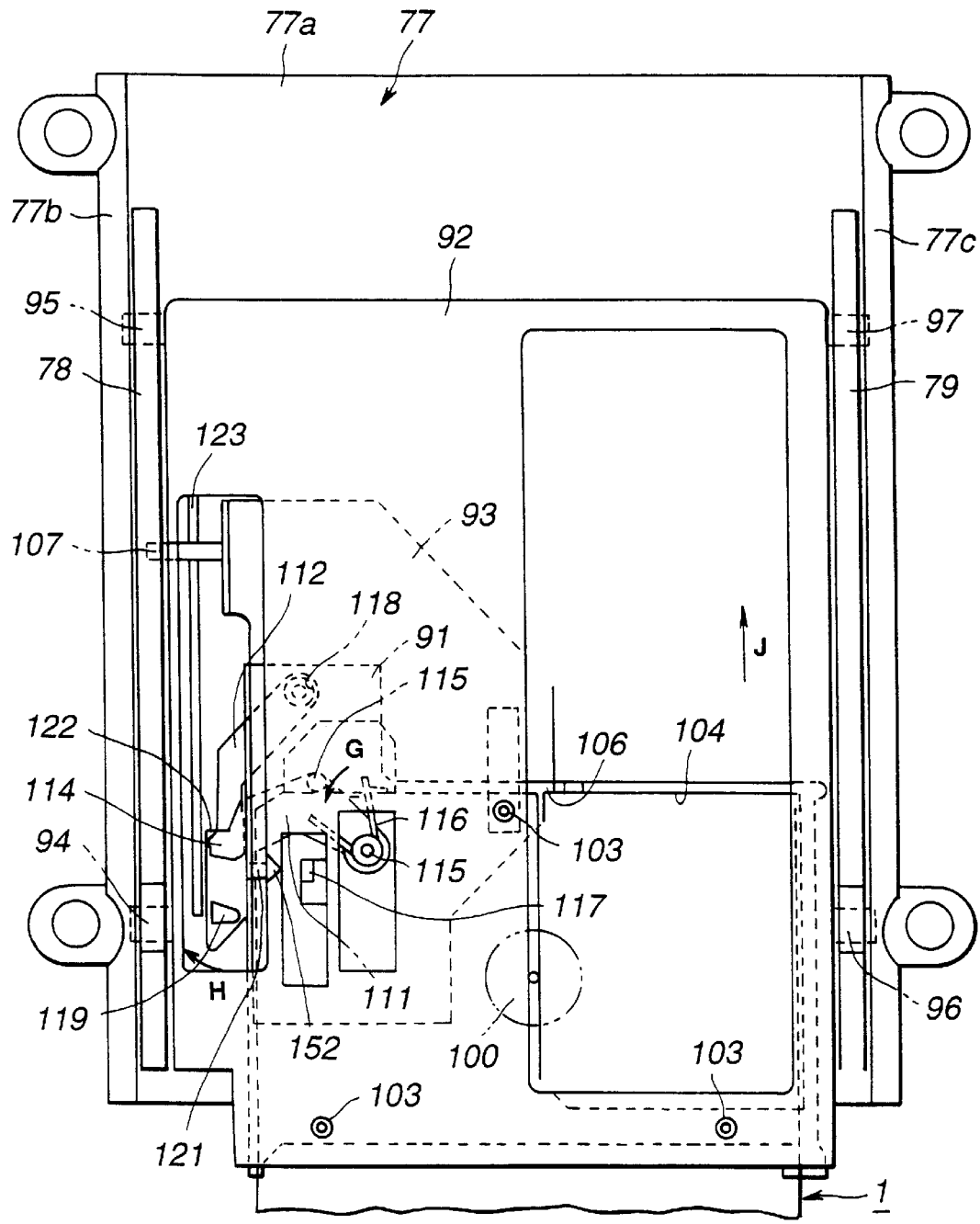
FIG. 14 is a plan view showing the state in which loading is started in the loading mechanism.
Figure 15:
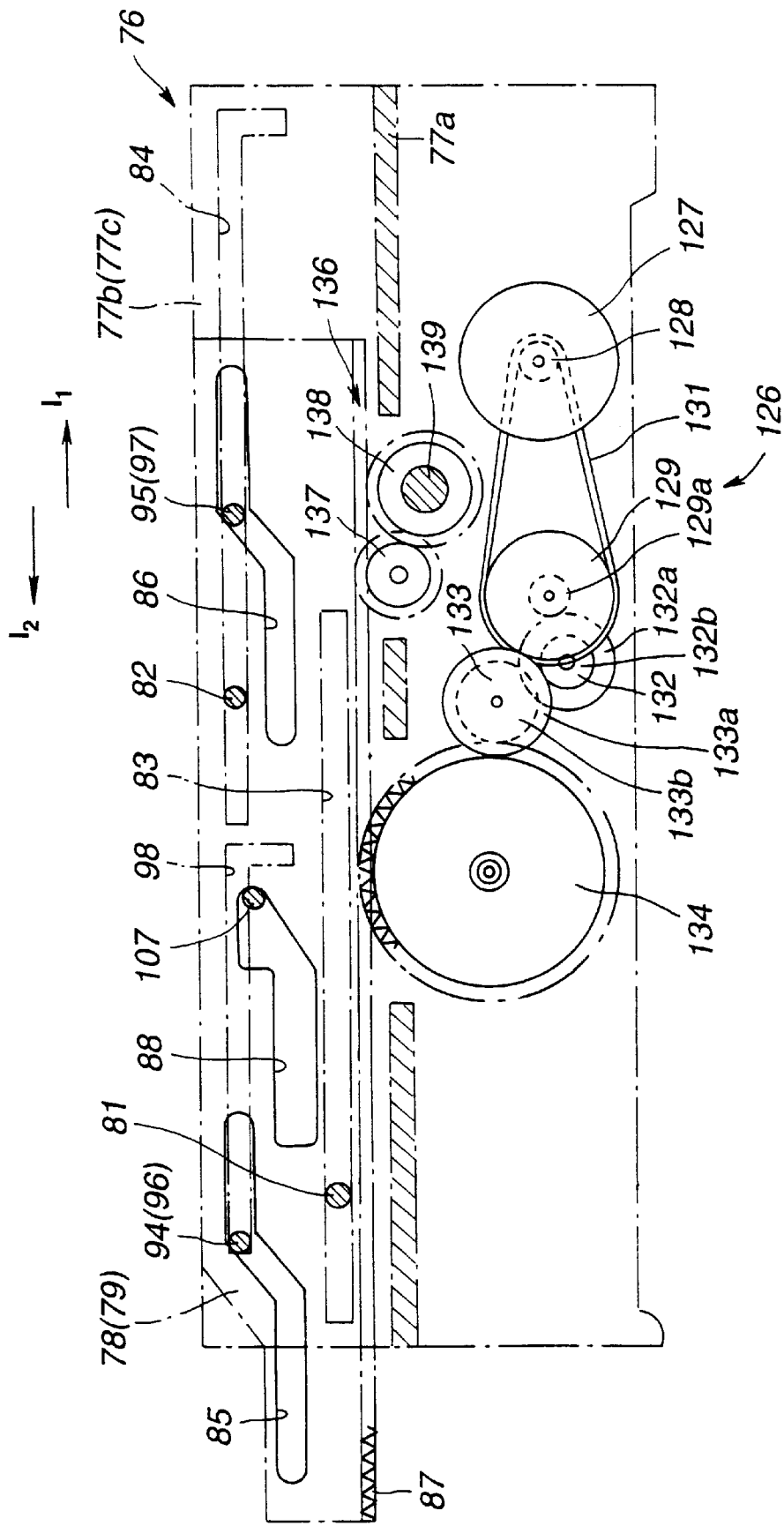
FIG. 15 is a side view showing the state in which the loading has been started in the loading mechanism.

When the loading motor 127 starts to be run in rotation such that the cam plates 78, 79 are moved to the rear side of the main body portion 61, as shown in FIGS. 14 and 15, the slider plate 93 follows up with this movement and is moved to the ear side of the main body portion 61, that is in the direction indicated by arrow J in FIG. 14. Since the actuating plate 92 is biased towards the forward side of the main body portion 61 with respect to the slider plate 93, by the coil spring 105 mounted under tension between the slider plate 93 and the cartridge holder 91, the actuating plate 92 is not moved towards the rear side of the main body portion 61. That is, the cam plates 78, 79 and the shutter member 93 are moved towards the back side of the main body portion 61 as the actuating plate 92 is kept halted with respect to the chassis 77. Therefore, the supporting pins 94, 96 of the actuating plate 92 are moved to the front side of the forward side cam grooves 85 of the cam plates 78, 79, as the supporting pins 94, 96 are positioned on the front side of the third supporting slit 99. The rear side supporting pins 95, 97 of the actuating plate 92 are moved to the forward side of the rear side cam grooves 86 of the cam plates 78, 79 as the supporting pins 95, 97 are positioned at the mid position of the second supporting slits 84.

The supporting protrusion 107 of the slider plate 93 thrusts the rear end of the engagement opening 88 by the coil spring 105 mounted under tension between the slider plate 93 and the cartridge holder 91. As the slider plate 93 is moved to the rear side of the main body portion 61, the loading arm 112 rides on the forward lateral edge of the stop wall section 123 to have sliding contact with the lateral side of the stop wall section 123 so as to be rotated towards the inside of the cartridge holder 91. This engages the engagement portion 121 of the loading arm 112 with the loading cut-outs 54, 55 provided in the lateral side 4b parallel to the inserting/detachment direction of the disc cartridge 1 to enable the disc cartridge to be pulled in the direction of the recording/reproducing unit 62.

The slider plate 93 is moved in the direction indicated by arrow J in FIG. 14, under the bias of the coil spring 105, in order to follow the movement of the cam plates 78, 79 in the direction indicated by arrow I1 in FIG. 15. The thrust piece 107, on which is abutted the lateral side 4a on the front surface of the disc cartridge 1, is moved to a position flush with the cartridge positioning wall section of the cartridge holder 91. In this state, the first thrust portion 27 constituting the shutter lock mechanism 21 of the disc cartridge 1 is thrust by the first thrust portion 152 provided on the cartridge holding section 101 of the cartridge holder 91. Thus, the lateral side 4a of the disc cartridge 1 is abutted against the thrust piece 107 of the slider plate 93, at the same time as it is abutted against the cartridge positioning wall section 104 of the cartridge holder 91. At this time, the supporting pins 94, 95, 96 and 97 of the actuating plate 92 are positioned at connecting points between the rear horizontal sections and the inclined sections of the cam grooves 73, 74, as shown in FIG. 15.

When the loading motor 127 starts its operation and the cam plates 78, 79 are moved to the rear side of the main body portion 61, the actuating plate 92 is moved to the rear side of the main body portion 61, as it maintains the relative position with the slider plate 93. That is, the cam plates 78, 79 are moved to the position at back of the third supporting slit 98 and the second supporting slit 84 as the supporting pins 94, 95, 96 and 97 of the actuating plate 92 are positioned at the connecting point between the rear side horizontal sections and the inclined positions of the cam grooves 85, 86. The relative position of the actuating plate 92 and the slider plate 93 is maintained by the coil spring 105 installed under tension between the slider plate 93 and the cartridge holder 91. The disc cartridge is loaded to above the recording/reproducing unit 62 provided with the disc rotation unit and the optical pickup device.

Figure 18:
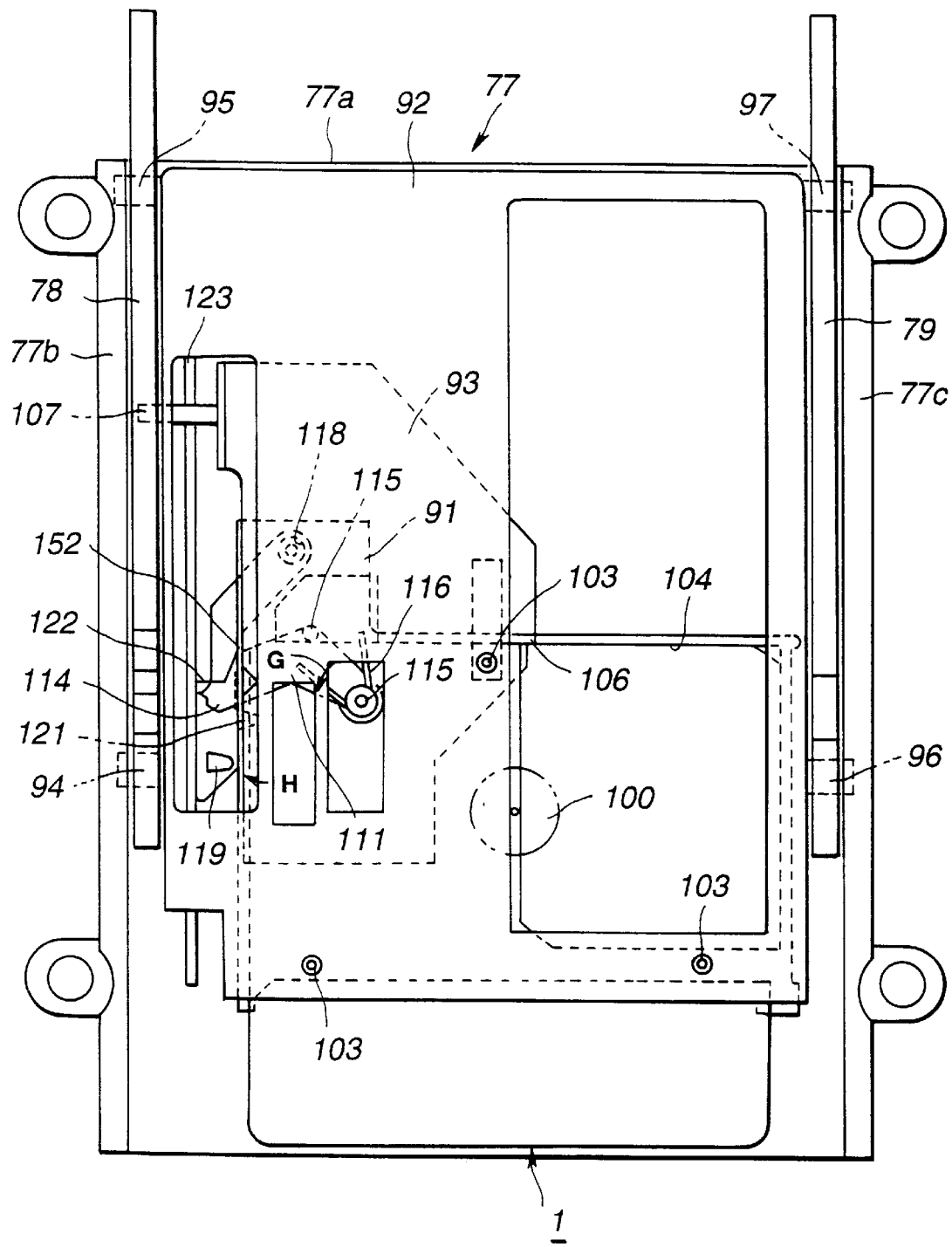
FIG. 18 is a plan view showing the state in which the loading in the loading mechanism has come to a close.
Figure 19:
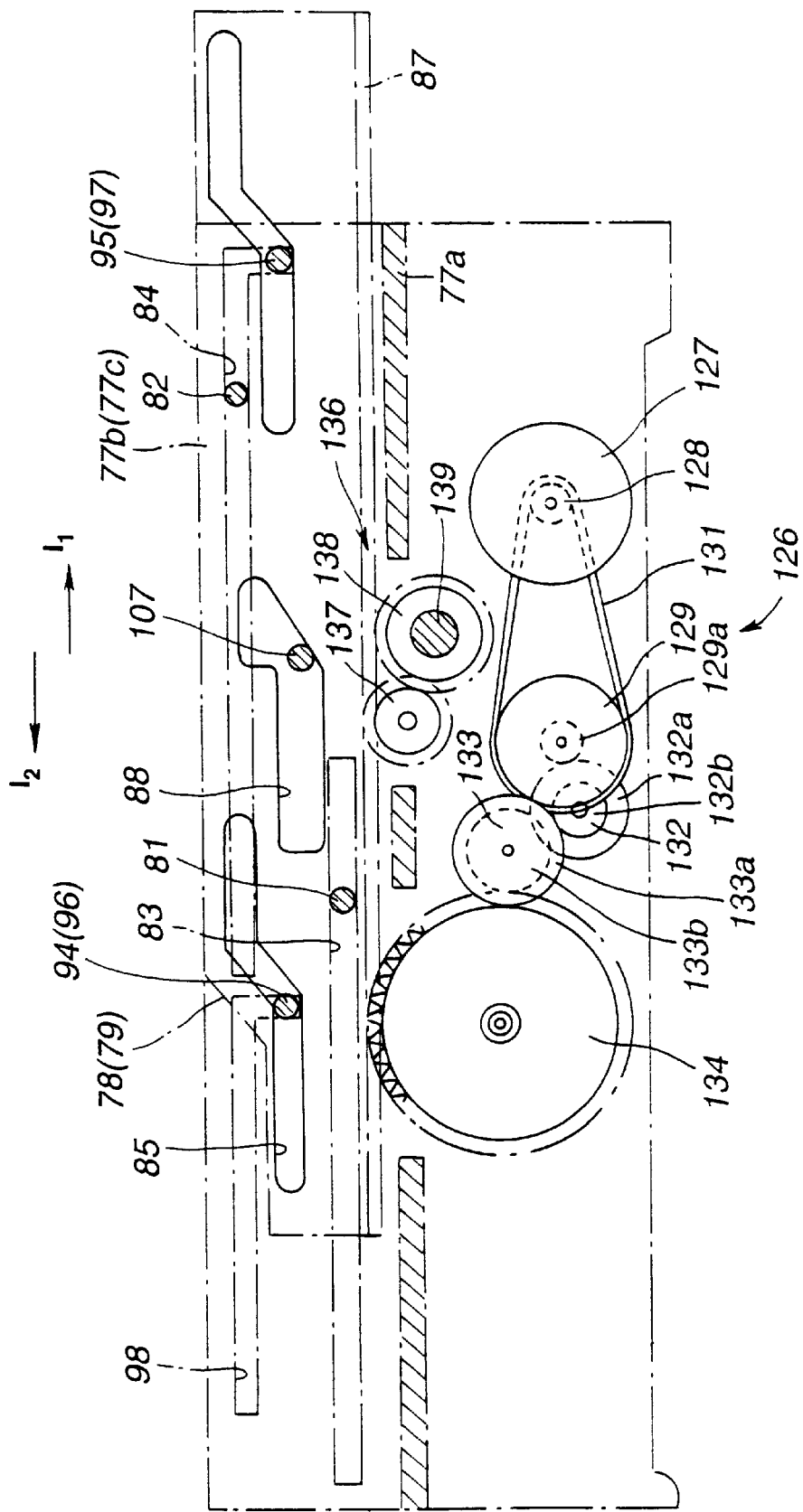
FIG. 19 is a side view showing the state of completion of loading in the loading mechanism.

When the loading motor 127 starts to be driven and the cam plates 78, 79 are moved to the rear side of the main body portion 61, the actuating plate 92 is moved downwards, that is, in a direction of approaching tire the recording/reproducing unit 62, as the relative position with respect to the slider plate 93 is kept, as shown in FIGS. 18 and 19. That is, the actuating plate 92 is lowered further by the supporting pins 94, 95, 96 and 97 of the actuating plate 92 abutting against the rear ends of the third supporting slit 98 and the second supporting slits 84 the supporting pins 94, 95, 96 and 97 are moved to the forward side lower horizontal sections of the cam grooves 85, 86 of the cam plates 78, 79. That is, the supporting pins 94, 95, 96 and 97 are positioned at the points of intersection of the third supporting slit 98 and the second supporting slits 84 with the cam grooves 85, 86 so as to be moved downwardly of the third supporting slit 98 and the second supporting slits 84. This loads the disc cartridge 1 on the recording/reproducing unit 62 to halt the loading motor 127.

When ejecting the disc cartridge loaded on the recording/reproducing unit 62 via the cartridge inserting/detachment opening 65, the loading motor 127 is driven in the reverse direction to cause movement of the cam plates 78, 79 in the direction indicated by arrow I2 in FIG. 19. By movement of the cam plates 78, 79 to the forward side of the main body portion 61, the supporting pins 94, 95, 96 and 97 of the actuating plate 92 are positioned at the points of intersection of the inclines sections of the cam grooves 85, 86 and the bent portions of the third supporting slit 98 and the second supporting slits 84 to the lower rear ends for spacing the actuating plate 92, that is the disc cartridge 1, held by the cartridge holder 91, away from the recording/reproducing unit 62.

When the cam plates 78, 79 are moved forwardly of the main body portion 61 by the loading motor 127, the actuating plate 92 is moved forwardly of the main body portion 61 as it is maintained in the same relative position with respect to the slider plate 93. That is, the cam plates 78, 79 are moved until the supporting pins 94, 95, 96 and 97 of the actuating plate 92 are positioned at the point of connection of the rear horizontal sections and the inclined sections of the cam grooves 85, 86. At this time, the relative position between the actuating plate 92 and the slider plate 93 is kept under the bias of the coil spring 105. The supporting pins 94, 95, 96 and 97 are moved to forwardly of the third supporting slits 98 and the second supporting slits 84. The disc cartridge is transported at this time to the cartridge inserting/detachment opening 65 from the recording/reproducing 62.

By forward movement of the cam plates 78, 79, the actuating plate 92 is halted when the forward side supporting pins 94, 96 have reached the forward ends of the third supporting slits 98. The rear end of the engagement opening 88 of the cam plate 78 thrusts the supporting protrusion 107 towards the front side of the main body portion 61, as shown in FIGS. 12 and 13, to cause movement of the slider plate 93 forwards. That is, the cam plates 78, 79 and the slider plate 93 are moved forwards as the actuating plate 92 is halted with respect to the chassis 77. By this forward movement of the slider plate 93, the disc cartridge 1 is thrust by the thrust piece 106 of the slider plate 93 so as to be moved to a position ahead of the positioning wall section 104 of the cartridge holder 91.

As the slider plate 93 is moved forwards in this manner, as shown in FIG. 12, the loading arm 112 has the retention portion 122 positioned at the forward end of the stop wall section 123 and is rotated towards the outer side of the cartridge holder 91 to retain the retention portion 122 at the forward end of the stop wall section 123. In this state, the rear end face of the disc cartridge 1 not carrying the shutter member 9 is exposed to outside and thereafter taken out by hand or finger from the main body portion 61.

The recording/reproducing unit 62 for recording or reproducing the optical disc 5 is now explained. In this recording/reproducing unit 62, a base block 141 constituting the recording/reproducing unit 62 is secured, such as with a set screw, to the bottom surface section 77a of the chassis 77 of the main body portion 61, and a disc rotation unit 142 for rotationally driving the optical disc 5 and the optical pickup device 143 for recording and reproducing the optical disc 5 are assembled into the base block 141, as shown in FIGS. 20 and 21.

Figure 20:
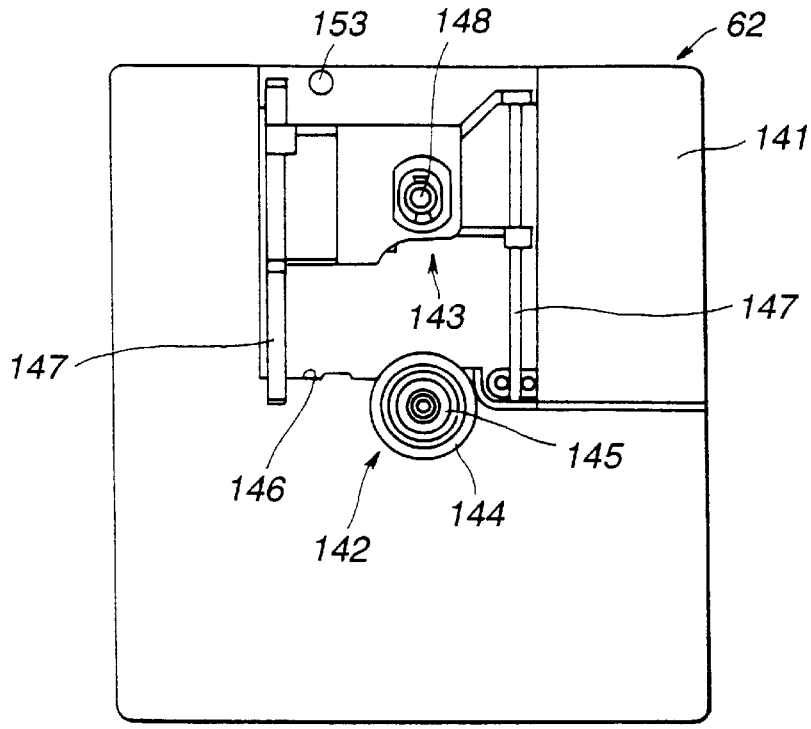
FIG. 20 is a plan view showing the structure of a recording/reproducing unit.
Figure 21:
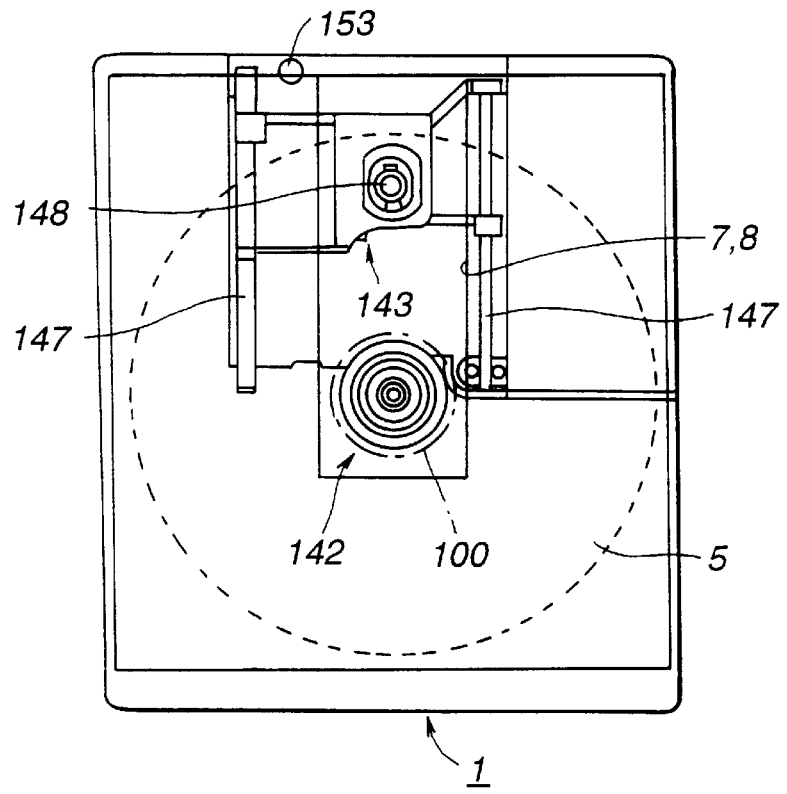
FIG. 21 is a plan view showing the loading state of the disc cartridge in the optical pickup device.

The disc rotation unit 142 is made up of a disc table 144 carrying the optical disc 5 and a spindle motor, not shown, for rotationally driving the disc table 144, as shown in FIG. 20. This disc table 144 is substantially disc-shaped and has a frustoconically shaped centering portion 145 at a mid area of its upper surface. The disc table 144 is provided with a magnet for magnetically attracting the damper 100 rotatably mounted on the major surface of the cartridge holder 91. The disc table 144 is intruded via the recording and/or reproducing apertures 7, 8 if the disc cartridge 1 and loaded on the d144 so that the optical disc 5 is run in rotation by the spindle motor in unison with the disc table 144.

The optical pickup device 143 faces the upper surface of the base block 141 via an aperture 146 formed in the base block 141. This optical pickup device 143 is supported by a guide shaft 147 supported on the base block 141 and is moved along the radius of the optical disc 5 loaded on the disc table 144 by a pickup mechanism, not shown in detail, under guidance by the guide shaft 147. This optical pickup device 143 illuminates a light beam radiated from a light source, such as semiconductor laser, housed in the optical block, on the signal recording surface of the optical disc 5 on the disc table via objective lens 148, while detecting the return light beam reflected from the optical disc 5 on the signal recording surface of the optical disc 5 to reproduce information signals recorded on the optical disc 5. The optical pickup device 143 illuminates a light beam on the signal recording surface of the optical disc 5 to change locally the crystal structure of the signal recording layer to record the information signals. In the present optical pickup device 143, the working distance between the signal recording surface of the optical disc and the objective lens is set to 560 $\mu$m or less, while the numerical aperture NA of the objective lens 148 is set to not less than 0.7 and the wavelength of the light beam radiated from the semiconductor laser is set to 680 nm or less.

Since the optical disc 5 in the present optical pickup device 143 is of high capacitance and the working distance is 560 $\mu$m or less, the disc cartridge 1 is intruded by the uplifting mechanism into the disc housing 6 via recording and/or reproducing apertures 7, 8. This uplifting mechanism has a motor, not shown, as a driving source, and is uplifted and lowered along a guide shaft provided upright with respect to the base block 141.

In this recording/reproducing 62, the shutter member 9 keeps the recording and/or reproducing apertures 7, 8 closed in the initial loaded state of the disc cartridge 1. The optical pickup device 143 is positioned below the base block 141.

If a reproducing button 64a is thrust, there is issued a command of causing movement of the shutter member 9 by control means, not shown, so that the shutter member 9 of the disc cartridge 1 is moved, by a shutter opening mechanism which will be explained subsequently in detail, to a position opening the recording and/or reproducing apertures 7, 8. In this state, the optical pickup device 143 is positioned below the base block 141 on the outer side of the disc cartridge 1.

The disc table 144 then is intruded via the opened recording and/or reproducing apertures 7, 8 so that the disc table 144 is engaged with the center hole 5a of the optical pickup device 5, at the same time as the optical disc is clamped by a damper 100 of the cartridge holder 91, in order to permit rotation of the optical disc 5. The optical pickup device 143 is intruded and is uplifted by the uplifting mechanism into the disc cartridge 1 via the apertures 7, 8 until the working distance is of the order of 560 $\mu$m. In this state, the optical disc is run in rotation by the disc rotation unit 142 at the same time as the optical pickup device 143 is fed along the radius of the disc 5 and the light beam is illuminated thereon to record or reproduce information signals.

Figure 22A:
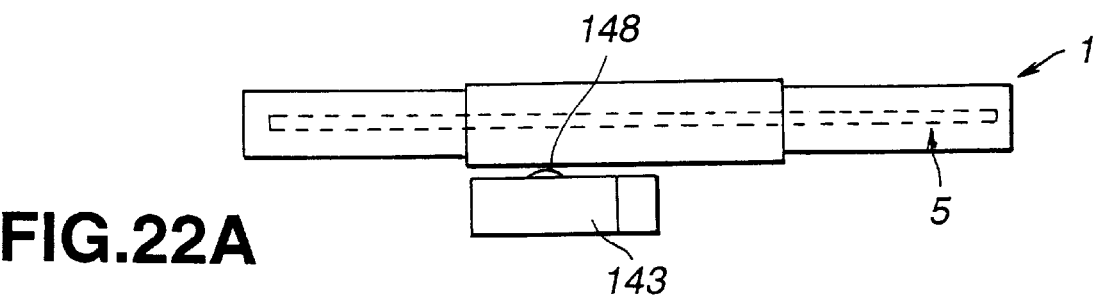
FIGS. 22A to 22C are front views showing the relation between the optical pickup device and the disc cartridge.
Figure 22B:
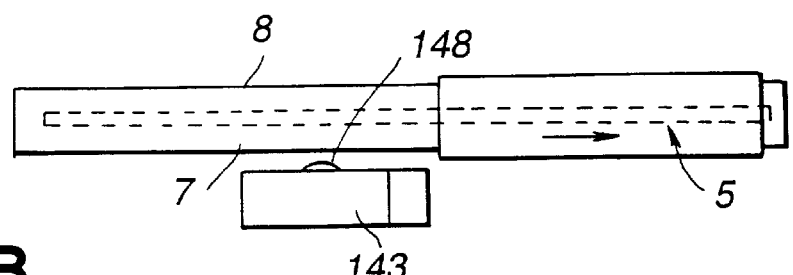
Figure 22C:
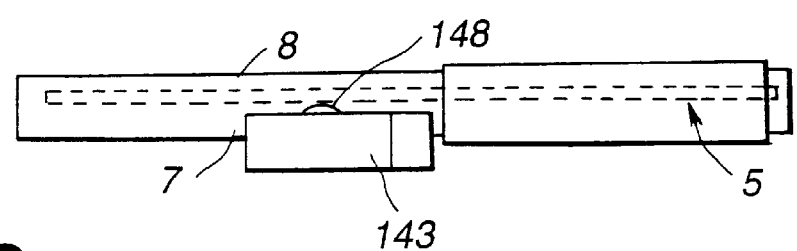

In case of recording or reproducing the optical disc 5, or in case of track jumping, that is on the necessary minimum occasions of using the optical pickup device, the shutter member 9 is moved to open the apertures 7, 8 (FIG. 22C). During the stand-by time when the optical disc is not run in rotation, such as during the time of standstill, the shutter member 9 closes the apertures 7, 8, as shown in FIG. 22A. The result is that foreign matter such as dust and dirt can be prevented from entering the inside of the disc cartridge so as to be deposited on the signal recording surface of the optical disc to assure reliable recording or reproduction of information signals.

In the foregoing, description has been made of uplifting the optical pickup device 143 by the uplifting mechanism to a position within the disc cartridge 1. It is however possible to render the optical pickup device 143 stationary and to uplift the b 141 by the uplifting mechanism.

Figure 23:
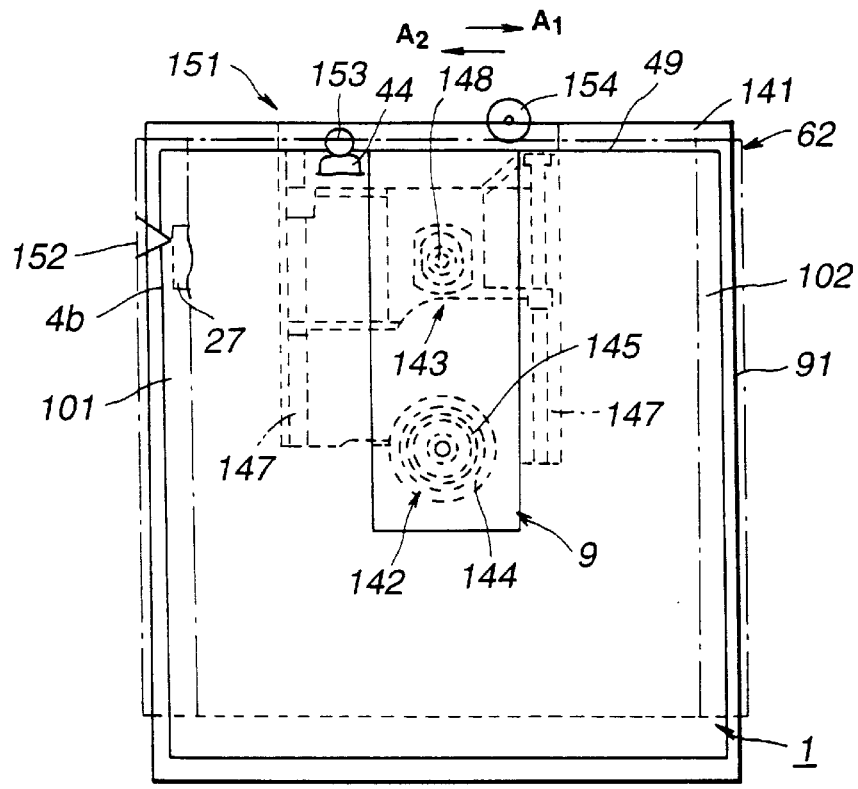
FIG. 23 is a plan view for illustrating a shutter opening mechanism of a shutter member provided in the optical disc device.
Figure 24:
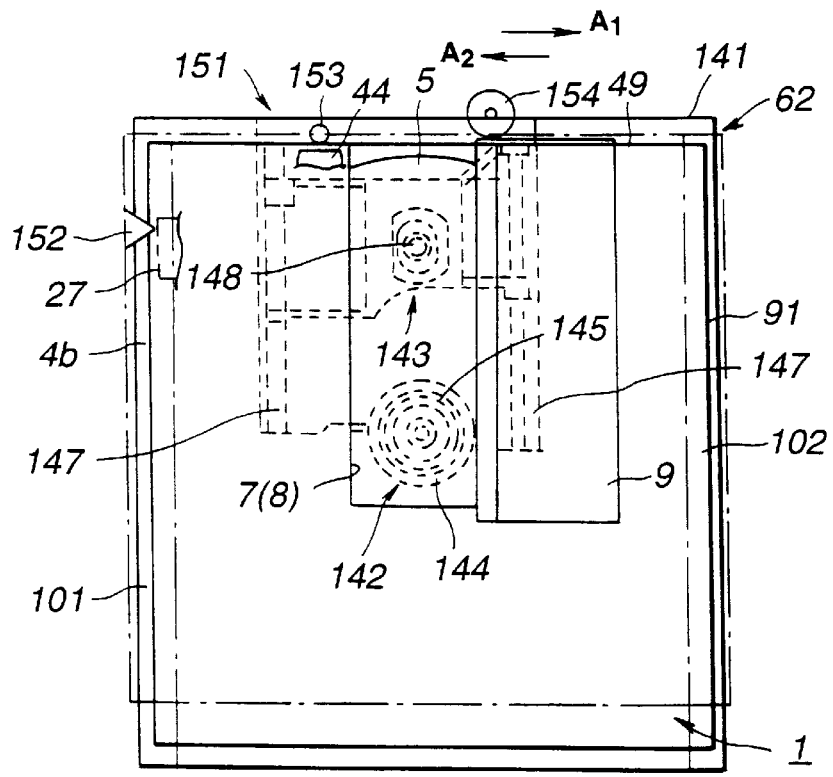
FIG. 24 is a plan view showing the state in which the shutter member has opened a recording and/or reproducing aperture by a shutter opening mechanism.

Referring to FIGS. 23 and 24, a shutter opening mechanism 151, configured for moving the shutter member 9 of the disc cartridge 1 between the reference position of closing the recording and/or reproducing apertures 7, 8 and the position opening these apertures 7, 8, is explained in detail.

Referring to FIG. 23, the shutter opening mechanism 151 includes a first thrusting portion 152, adapted for thrusting the first thrust portion 27 of the shutter lock mechanism 21 provided on the lateral surface 4b of the disc cartridge 1 extending parallel to the inserting/detachment direction of the disc cartridge 1, a second thrusting portion 153, configured for thrusting the thrust portion 44 of the shutter lock mechanism 21 provided on the lateral surface of the front side of the disc cartridge 1, and a shutter actuating unit 154 configured for causing movement of the shutter member 9 between the position closing the apertures 7, 8 and the position opening the apertures 7, 8.

The first thrusting portion 152 is provided at back of the cartridge holding section 101 of the cartridge holder 91 as a protrusion extending into the inside of the cartridge holder 91. When the disc cartridge 1 is inserted via the cartridge inserting/detachment opening 65 of the main body portion 61 and held by the cartridge holder, the first thrusting portion 152 is intruded via the guide portion 20 of the lateral surface 4b of the disc cartridge 1 to thrust the first thrust portion 27.

The second thrusting portion 153 is formed as a protrusion on the back side of the base block 141 constituting the recording/reproducing unit 62 in the main body portion 61, and is configured for thrusting the second thrust portion 44 on the lateral surface 4a of the disc cartridge 1 when the disc cartridge 1 held on the cartridge holder 91 is loaded on the base block 141 by the above-mentioned loading mechanism 76.

The shutter actuating unit 154 is constituted by a roll sheathed by an elastic material and which is run in rotation by a motor not shown as a driving source. The shutter actuating unit 154 is provided at a mid portion on the lateral side of the rear surface of the base block 141 so that the roll compresses against the connecting portion 18 on the lateral side 4a of the disc cartridge 1. By the roll being run in one direction or in the opposite direction by the motor as the driving source, the shutter actuating unit 154 is moved in the direction indicated by arrow A1 or A2 in FIG. 23, respectively, to permit intrusion via the apertures 7, 8 into the disc cartridge 1.

The shutter opening mechanism 151 operates so that, if the disc cartridge 1 is inserted via the cartridge inserting/detachment opening 65 and held in the cartridge holder 91, the first thrusting portion 152 provided on the cartridge holding section 101 of the cartridge holder 91 thrusts the first thrust portion 27 of the lateral side 4b of the disc cartridge 1. This causes rotation of the rotary member 22 provided with the first thrust portion 27 in the direction indicated by arrow C1 in FIG. 5 to rotate the control member 24 in the direction indicated by arrow d2 in FIG. 5 via connecting arm 25. This relinquishes the state of engagement between the reception portion 43 of the control member 24 and the protuberance 42 of the lock member 23 to liberate the lock member 23 from thrusting by the control member 24.

When the disc cartridge 1 held by the cartridge holder 91 is loaded on the base block 141 of the recording/reproducing unit 62, the second thrust portion 44 of the lateral side 4a on the front surface of the disc cartridge 1 is thrust by the second thrusting portion 153. The shutter lock mechanism 21 then operates so that the lock member 23 provided on the second thrust portion 44 is rotated in the direction indicated by arrow E2 in FIG. 6 to relinquish the state of retention between the lock portion 41 of the lock member 23 and the projection 39 of the shutter member 9 to enable movement of the shutter member 9.

The shutter opening mechanism 151 causes movement of the shutter member 9 in the direction indicated by arrow A1 in FIGS. 6 and 24 by the shutter actuating unit 154 only when the optical pickup device 143 is used, such as for recording or reproducing information signals, in order to enable intrusion of the optical pickup device 143 into the disc cartridge 1.

Figure 25:
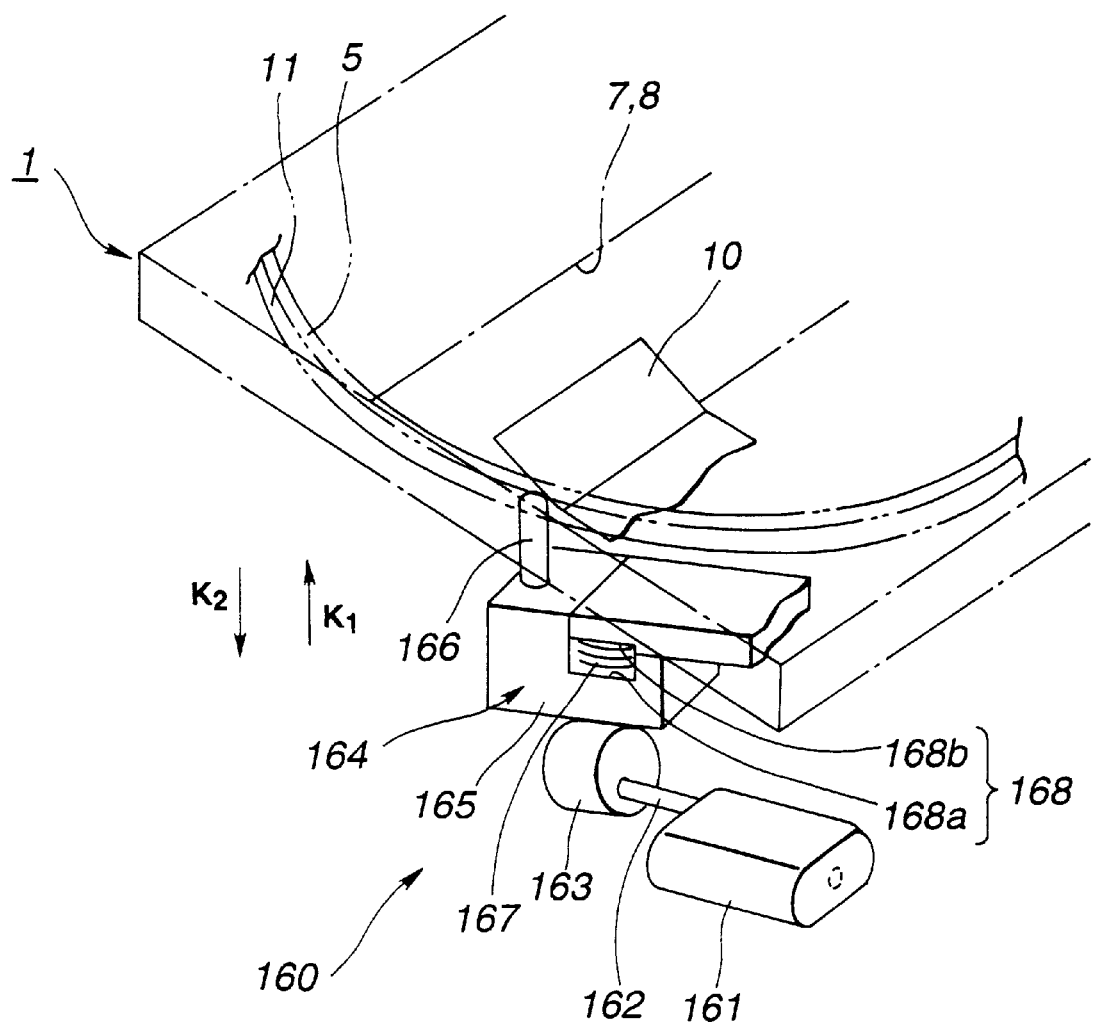
FIG. 25 is a perspective view showing a thrusting mechanism for thrusting a cleaning sheet adapted for cleaning the signal recording surface of the optical disc.
Figure 26:
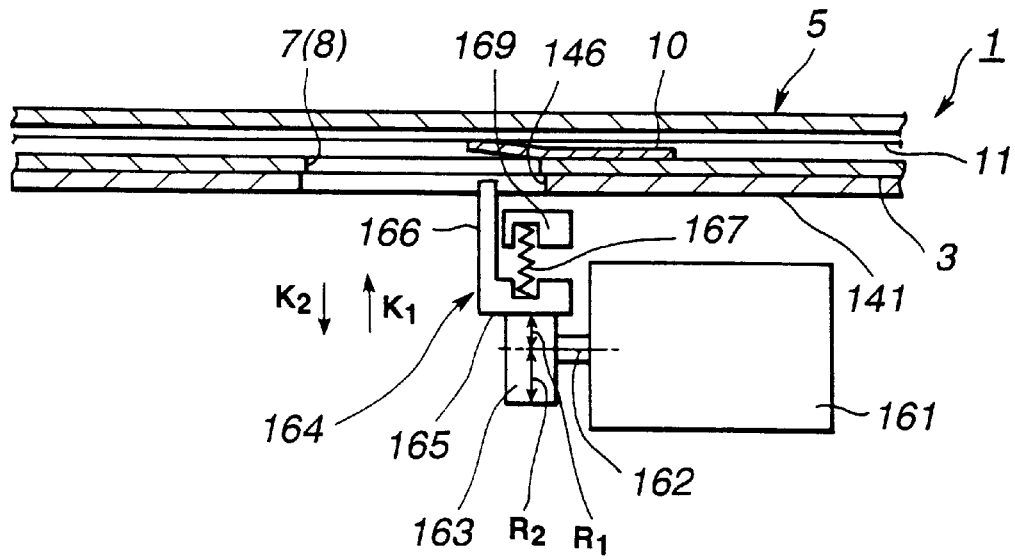
FIG. 26 illustrates the state in which a thrusting portion of the thrusting mechanism has been receded to outside the disc cartridge.
Figure 27:
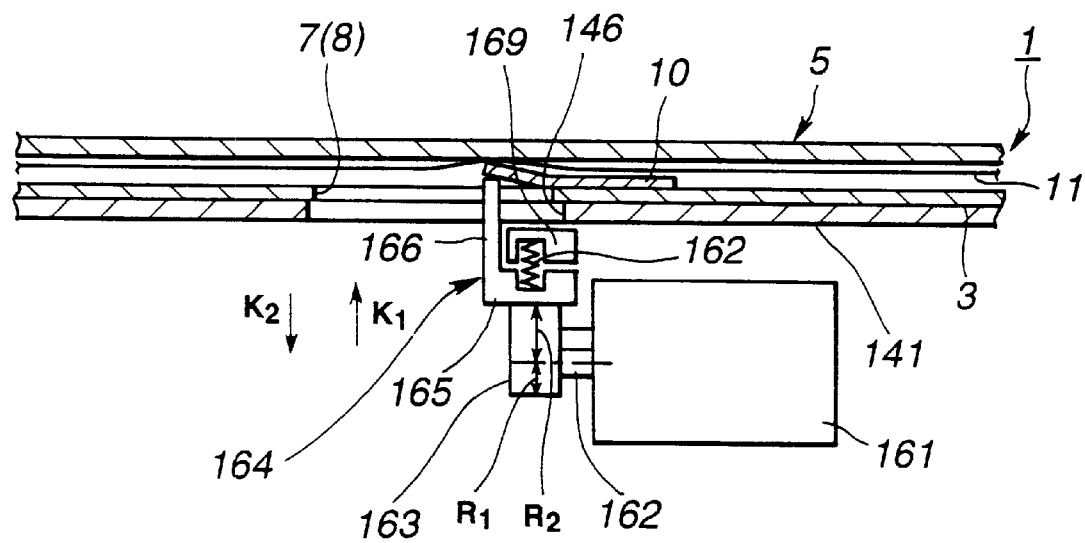
FIG. 27 shows the state in which the thrusting portion of the thrusting mechanism is intruded into the disc cartridge t contact the cleaning sheet with the signal recording surface of the optical disc.
Figure 28:
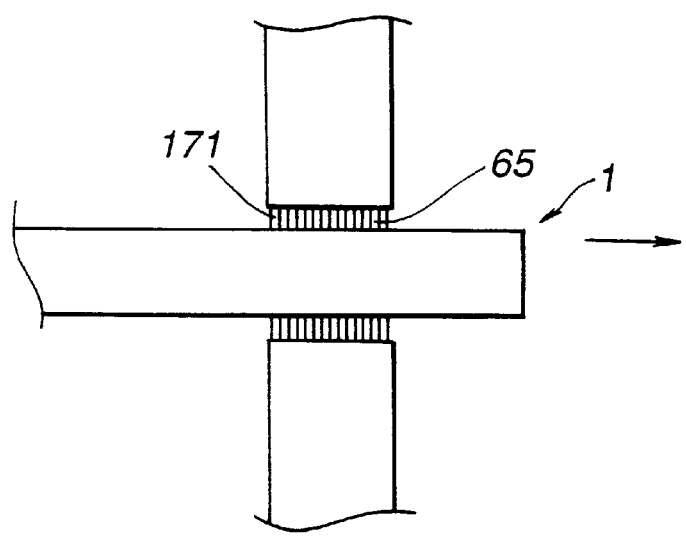
FIG. 28 illustrates another example of a cleaning mechanism provided around the cartridge inserting/detachment opening.
Figure 29:
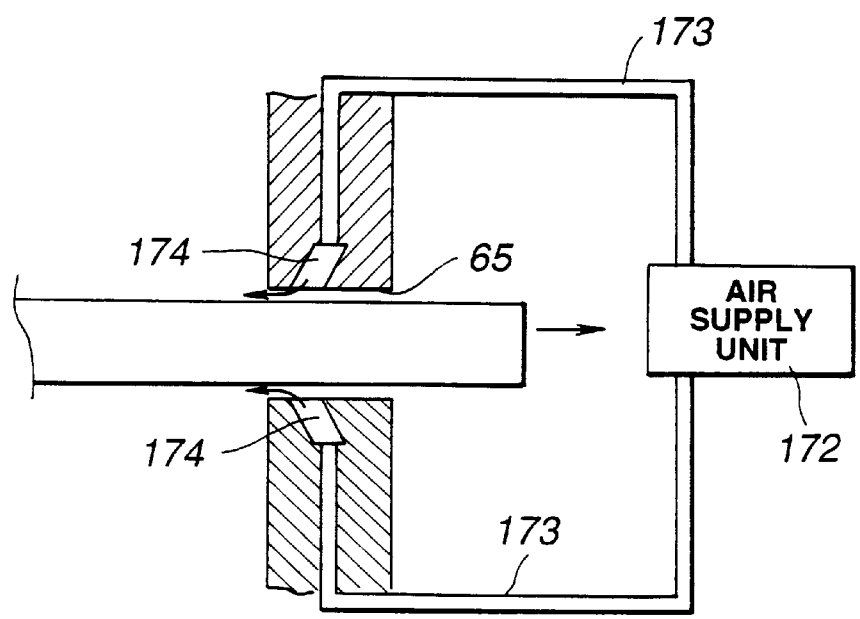
FIG. 29 illustrates a further example of a cleaning mechanism provided around the cartridge inserting/detachment opening.

Referring to FIGS. 25 to 27, a thrusting actuating mechanism 160, adapted for thrusting the thrusting member 10 provided in the disc cartridge 1 to contact the cleaning sheet 11 with the optical disc 5, is explained.

This thrusting actuating mechanism 160 includes a thrusting actuating member 164 uplifted and lowered by an eccentric member 163 mounted on the distal end of a driving shaft 162 of a driving motor 161 as a driving source. The driving motor 161 is arranged on the back side of the base block 141 constituting the recording/reproducing unit 62 and has its driving shaft 162 exposed via an opening 146 used for exposing the optical pickup device 143 to the recording/reproducing unit 62. An eccentric member 163 mounted on the driving shaft 162 of the driving motor 161 is circular in profile and carries the driving shaft 162 at a point offset from the center of circular rotation.

The thrusting actuating member 164 has a main body portion 165 the bottom surface of which is abutted against the eccentric member 163 and is moved by a guide shaft mounted upright on the base block 141, that is in the direction indicated by arrow $K_1$ or $K_2$ in FIG. 25. The upper surface towards the base block 141 of the main body portion 165 is provided with a pin-shaped thrusting actuating portion 166 thrusting the thrusting member 10 in turn thrusting the cleaning sheet 11 provided in the disc cartridge 1. The main body portion 165 has a recess 168a constituting an elastic member housing 168 housing an elastic member 167 in the form of a coil spring. Within the recess 168a is arranged a stationary member 169 secured to the base block 141. This stationary member 169 includes a recess 168b designed to constitute the elastic member housing 168 along the recess 168a of the thrusting actuating member 164. Thus, the thrusting actuating member 164 is biased at all times away from the disc cartridge 1 by the elastic member 167 housed in the elastic member housing 168 in the direction indicated by arrow $K_2$ in FIG. 25 into pressure contact with the eccentric member 163.

Figure 16:
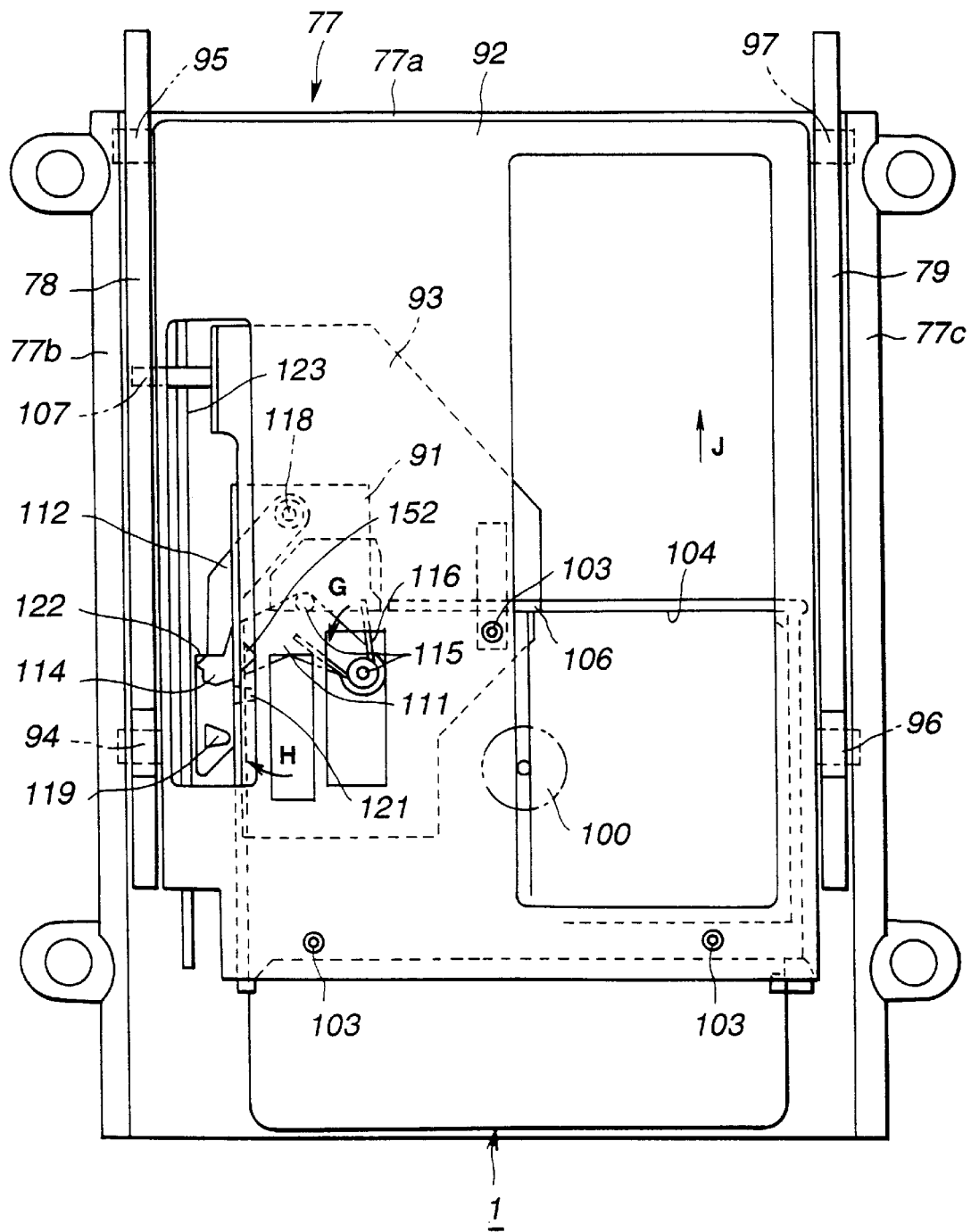
FIG. 16 is a plan view showing the state in which the disc cartridge in the loading mechanism has been transported to the rear side of a main body unit of the device.
Figure 17:
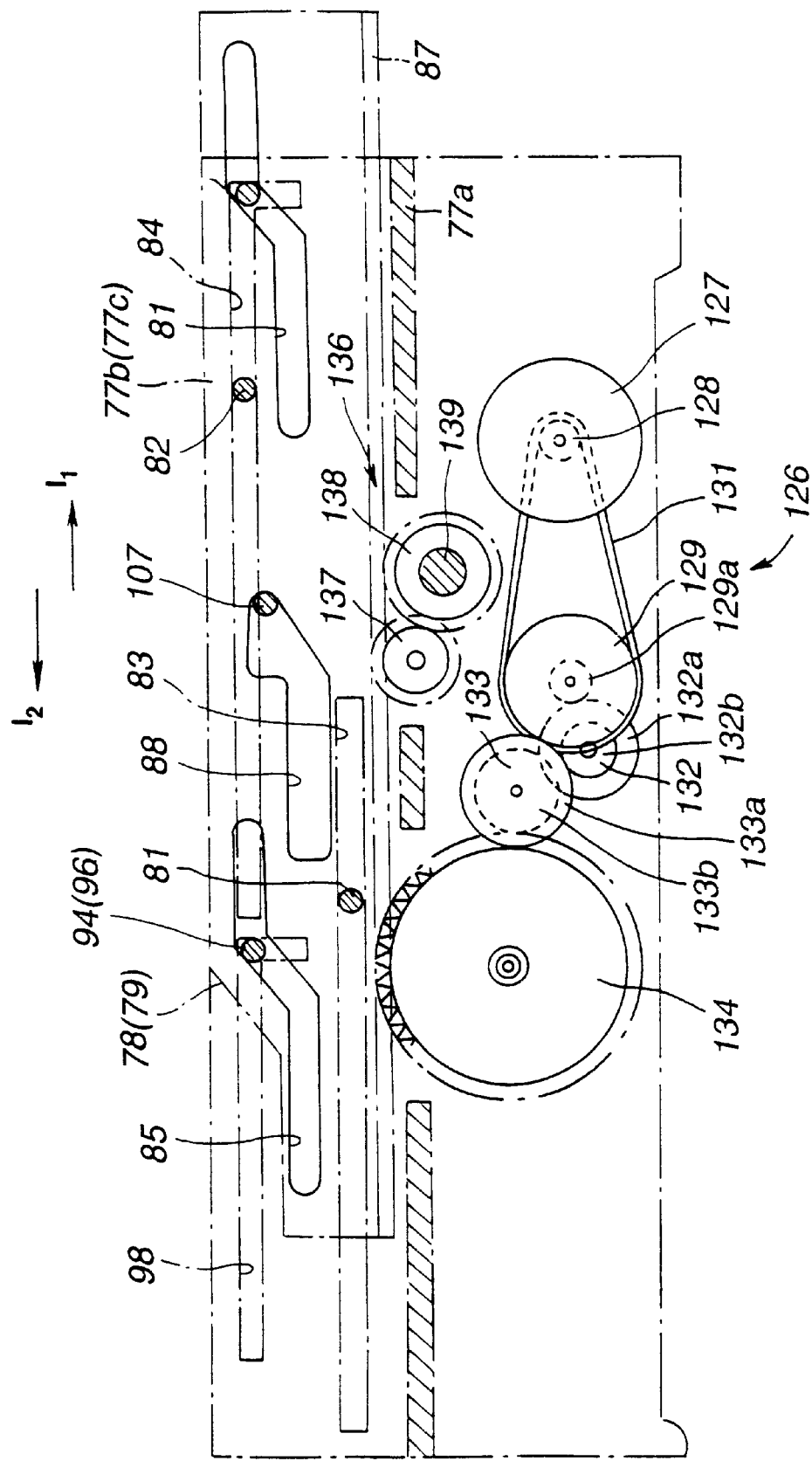
FIG. 17 is a side view showing the state in which the disc cartridge in the loading mechanism has been transported to the rear side of a main body unit of the device.

If the optical disc 5 is not to be cleaned, such as when the optical disc is being recorded or reproduced, the thrusting actuating mechanism 160 is in an upwardly directed state in which the short radius R1 of the eccentric member 163 is directed towards the base block 141. Thus, the thrusting actuating member 164 is in the lowered state in the direction indicated by arrow $K_2$ in FIG. 16, with the thrusting actuating portion 166 not being protruded towards the recording/reproducing unit 162.

If, on completion of loading of the disc cartridge 1, recording/reproducing errors are produced, and the shutter member 9 opens the recording and/or reproducing apertures 7, 8 by the shutter opening mechanism 151, the thrusting actuating mechanism 160 drives the driving motor 161, with the long radius R2 of the eccentric member 163 being directed upwards to the side of the base block 141. The thrusting actuating member 164 is uplifted in the direction indicated by arrow K1 in FIG. 27 towards the base block 141 against the bias of the elastic member 167 such that the thrusting actuating portion 166 is intruded via the apertures 7, 8 of the disc cartridge 1 to thrust the thrusting member 10 in the disc cartridge 1. This thrusts the cleaning sheet 11 by the thrusting member 10 into contact with the signal recording surface of the optical disc 5. The optical disc 5 is run in rotation by the disc rotation unit 142 by the disc rotation unit 142 to wipe off foreign matter affixed to the signal recording surface.

If, in the above-described optical disc device 60, the disc cartridge 1 is inserted via the cartridge inserting/detachment opening 65, in such a state in which the outer surface of the disc cartridge has been freed of foreign matter by the cleaning member 67 provided at the cartridge inserting/detachment opening 65 of the main body portion 61, the disc cartridge 1 is intruded via the cartridge inserting/detachment opening 65, it is transported by the loading mechanism 76 as far as the recording/reproducing unit 62 within the main body portion 61. At this time, the lateral side 4a of the front surface of the disc cartridge 1 compresses against the cartridge positioning wall section 104 of the cartridge holder 91, as shown in FIG. 14. When the disc cartridge is held by the cartridge holder 91, the first thrust portion 27 of the disc cartridge 1 is thrust by the first thrusting portion 152 of the shutter opening mechanism 151 provided on the cartridge holding section 101 of the cartridge holder 91. In this state, the disc cartridge 1 is loaded until it is loaded on the recording/reproducing unit 62.

When the disc cartridge 1 is loaded on the recording/reproducing unit 62, the second thrust portion 44 of the disc cartridge 1 is thrust by the second thrusting portion constituting the shutter opening mechanism 151 provided on the base block 141. Thus, the locked state of the shutter member 9 of the disc cartridge 1 is relinquished by the shutter lock mechanism 21. However, the recording and/or reproducing apertures 7, 8 are as yet closed.

When the optical disc is to be run in rotation, such as when recording/reproducing the optical disc 5, there is issued a command for moving the shutter member 9 in the opening direction by control means, not shown, such that the shutter member 9 is moved by the shutter actuating unit 154 in a direction of opening the apertures 7, 8. The optical disc is then clamped by the disc rotation unit 142 and enabled to be run in rotation. The optical pickup device 143 also is intruded via the apertures 7, 8. As the optical disc 5 is run into rotation, a light beam is illuminated on the optical pickup device 143 on the signal recording surface for recording and/or reproducing information signals.

During the stand-by time when the optical disc device loaded on the recording/reproducing unit 62 without the optical disc being run in rotation, the optical pickup device 143 is receded out of the disc cartridge 1 such that the apertures 7, 8 are closed by the shutter opening mechanism 151. This prohibits foreign matter from being intruded into the inside of the disc cartridge 1.

If, in the optical disc device 1, the disc cartridge is loaded in position, or recording/reproducing errors are detected, as shown in FIG. 27, the thrusting actuating portion 166 constituting the thrusting actuating mechanism 160 is intruded into the disc cartridge 1 via the apertures 7, 8 to contact the cleaning sheet 11 with the signal recording surface of the optical disc 5 to clean the signal recording surface.

In the above-described optical disc device 60, when the disc cartridge 1 is intruded into the main body portion 61 via the cartridge inserting/detachment opening 65, the cleaning member 67 provided around the cartridge inserting/detachment opening 65 wipes off dust and dirt affixed to the disc cartridge 1 to prevent dust and dirt from entering the inside of the recording/reproducing unit 62 as well as to prevent foreign matter from becoming affixed to the objective lens 148 of the optical pickup device 143. By allowing the recording/reproducing apertures 7, 8 to be opened only on necessary minimum occasions, such as when recording/reproducing the optical disc 5 or doing track jumping, and by closing the apertures 7, 8 such as during the non-operating time, it is possible to prevent foreign matter, such as dust and dirt, from entering the inside of the disc cartridge 1. Moreover, since the signal recording surface of the optical disc is cleaned by the cleaning sheets 11a, 11b only during loading of the optical disc 5 on the recording/reproducing unit immediately before start of the recording or reproduction or during recording/reproducing error detection, it is possible to prevent the signal recording surface of the optical disc from being scratched or to clean the signal recording surface of the optical disc 5. From the foregoing it is seen that the optical disc devoice 60 can reliably record/reproduce information signals.

The foregoing description has been made of the case wherein the cleaning member 67 has been provided around the cartridge inserting/detachment opening 65. The present invention is however not limited to this configuration. For example, a cleaning brush 171 may also be provided around the cartridge inserting/detachment opening 65.

There may also be provided a cleaning mechanism in which air supplied from an air supply unit 172 is supplied via pipe 173 to an air injection portion 174 provided around the cartridge inserting/detachment aperture 173. In this case, the air injection portion 174 is constructed so that air will be ejected towards outside of the main body portion 61 so that the dust and dirt affixed to the outer surface of the disc cartridge will not be introduced into the main body portion 61.

Figure 30:
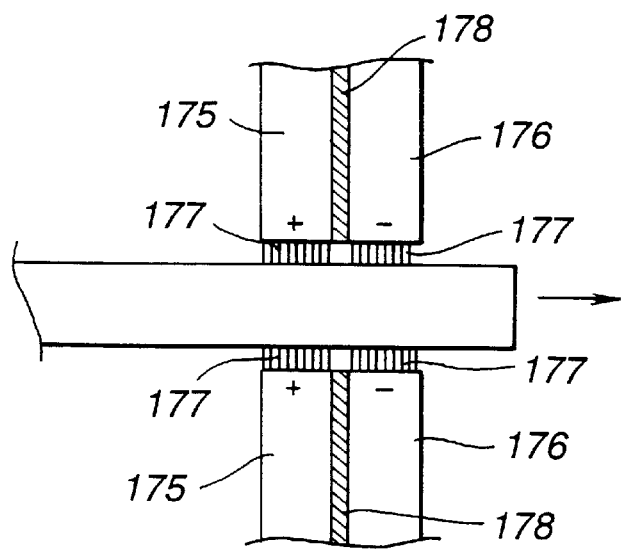
FIG. 30 illustrates a further example of a cleaning mechanism provided around the cartridge inserting/detachment opening.
Figure 31:
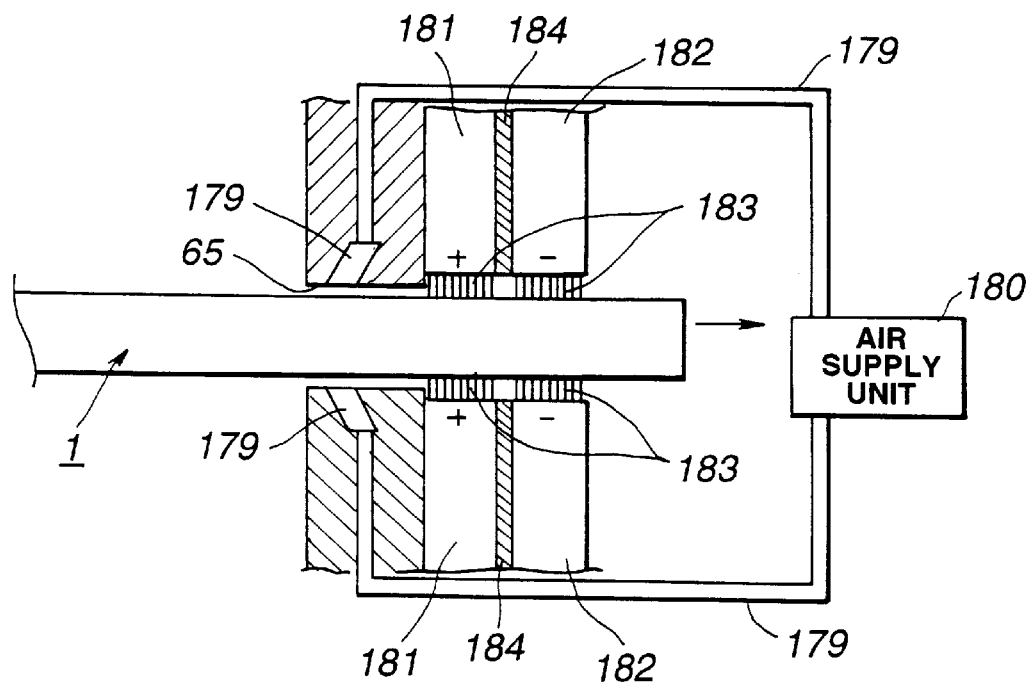
FIG. 31 illustrates yet another example of a cleaning mechanism provided around the cartridge inserting/detachment opening.

Around the cartridge inserting/detachment opening 65, a positive electrode 175 and a negative electrode 176 may be provided with the interposition of an insulator 178 to electrify brushes 77 attached to the a positive electrode 175 and a negative electrode 176 to adsorb dust and dirt affixed to the outer surface of the disc cartridge 1, as shown in FIG. 30.

Around the cartridge inserting/detachment opening 65, there may also be provided a first cleaning mechanism adapted for supplying air supplied from an air supply unit 180 via pipe to an air ejection unit 179 provided around the cartridge inserting/detachment opening 65 and a second cleaning mechanism adapted for electrifying brushes 183 mounted on a positive electrode 181 and the negative electrode 182 with the interposition of an insulating member 184. The first cleaning mechanism is provided outside of the peripheral wall section of the disc inserting/detachment opening 65. If air is sent from the air supply unit 180, the first cleaning mechanism wipes off dust and dirt to outside of the main body portion 61. Meanwhile, the ejection unit 179 is configured for ejecting air to outside the main body portion 61 to prevent dust and dirt affixed to the outer surface of the disc cartridge from entering the inside of the main body portion 61. The second cleaning mechanism electrifies the brushes 183 mounted on the positive electrode 181 and the negative electrode 182 to adsorb dust and dirt left on the outer surface of the disc cartridge 1 after wiping off with the first cleaning mechanism.

What is claimed is:

1. An optical disc device for recording/reproducing an optical disc in a disc cartridge that includes a main cartridge body unit rotatably holding the optical disc, an aperture formed in said main cartridge body unit for partially exposing a signal recording area of said optical disc and a movable shutter member mounted on said main cartridge body unit closing said aperture, said optical disc device comprising:

loading means for loading and unloading the disc cartridge into and out of a main body portion of the optical disc device;

shutter actuating means for moving the shutter member for opening the aperture in the main cartridge body unit after the disc cartridge is loaded in the main body portion in response to a recording/reproducing command input by a user of the optical disc device; and recording and/or reproducing means intruding into the main cartridge body unit via said aperture following opening of the aperture by the shutter actuating means moving the shutter member for recording and/or reproducing information signals to/from the optical disc.

2. The optical disc device according to claim 1 wherein the cartridge has a lock member for locking said shutter in a position closing said aperture and further comprising unlock means for unlocking said lock member of the cartridge loaded in the main body portion of the optical disc device by said loading means.

3. The optical disc device according to claim 1 further comprising:

detection means for detecting identification information provided in the main cartridge body unit.

4. The optical disc device according to claim 1 further comprising:

a cartridge inserting/detachment opening via which the disc cartridge is inserted into or detached from the main body portion of the optical disc device; and cleaning means provided around said cartridge inserting/detachment opening for cleaning a surface of said main cartridge body unit whereat said signal recording area is located on said optical disc.

5. The optical disc device according to claim 4 wherein said cleaning means is formed by a non-woven fabric.

6. The optical disc device according to claim 4 wherein said cleaning means is formed as a brush.

7. The optical disc device according to claim 4 wherein said cleaning means includes an air nozzle provided around said cartridge inserting/detachment opening and having an ejecting portion arranged towards an exterior of the main body portion of the optical disc device and an air supply unit for supplying air to said air nozzle.

8. The optical disc device according to claim 4 wherein said cleaning means includes an air nozzle contacting the surface of the disc cartridge and an electrode portion made up of a positive electrode and a negative electrode for electrifying a cleaning portion of the cleaning means.

9. The optical disc device according to claim 4 wherein said cleaning means includes a first cleaning mechanism provided with an air nozzle around said cartridge inserting/detachment opening and having an ejecting portion arranged towards an exterior of the main body portion of the optical disc device, an air supply unit for supplying air to said air nozzle, and a second cleaning mechanism having a cleaning portion contacting the surface of the disc cartridge and an electrode portion made up of a positive electrode and a negative electrode for electrifying the cleaning portion, wherein said first cleaning mechanism is arranged further towards the exterior of the main body portion than the second cleaning mechanism.

10. The optical disc device according to claim 1 further comprising:

a cleaning unit arranged in a disc housing in the main cartridge body unit for cleaning a signal recording surface of the optical disc; and thrusting actuating means for thrusting the cleaning unit into contact with the signal recording surface when the disc cartridge is loaded by said loading means in a position for recording and/or reproducing the information signals by the recording and/or reproducing means.

11. The optical disc device according to claim 10 wherein said thrusting actuating means thrusts said cleaning unit against the signal recording surface of the optical disc when recording and/or reproducing errors of the information signals are detected upon said recording and/or reproducing means recording and/or reproducing the optical disc.

12. An optical disc device for recording and/or reproducing information signals to/from a disc cartridge having a main cartridge body unit rotatably housing an optical disc, an aperture formed in said main cartridge body unit for partially exposing a signal recording surface of the optical disc to outside, and a shutter member movably mounted on said main cartridge body unit for opening/closing said aperture, comprising:

loading means for loading said disc cartridge into and out of the optical disc device;

a recording/reproducing unit having disc rotation means for rotationally driving the optical disc housed in the disc cartridge and an optical head for illuminating a light beam on the optical disc for recording and/or reproducing the information signals to/from the optical disc; and shutter actuating means for moving the shutter member to open the aperture in said cartridge in response to a recording and/or reproducing command input by a user of the optical disc device after loading the disc cartridge on the recording/reproducing unit in position for recording and/or reproducing information signals, wherein said disc rotation means and the optical head intrude into the main cartridge body unit via said aperture to record and/or reproduce information signals when said shutter member has been moved to open the aperture in said main cartridge body unit.

13. The optical disc device according to claim 12 wherein the disc cartridge includes a lock member for locking the shutter member at a position closing said aperture and wherein the optical disc device further comprises unlock means for unlocking the shutter member locked by the lock member.

14. The optical disc device according to claim 12 further comprising detection means for detecting identification information provided in the disc cartridge.

15. The optical disc device according to claim 12 further comprising:

a cartridge inserting/detachment opening for inserting or detaching the disc cartridge into or from the optical disc device; and cleaning means arranged around said cartridge inserting/detachment opening for cleaning a surface of the main cartridge body unit of the disc cartridge.

16. The optical disc device according to claim 15 wherein said cleaning means is formed by a non-woven cloth.

17. The optical disc device according to claim 16 wherein a cleaning unit for cleaning the signal recording surface of the optical disc is provided in the disc housing formed in the main cartridge body unit and wherein the optical disc device further comprises thrusting actuating means for thrusting the cleaning unit into contact with the signal recording surface of the optical disc when the disc cartridge is loaded by said loading means onto the recording/reproducing unit for recording and/or reproducing the optical disc.

18. The optical disc device according to claim 17 wherein said thrusting actuating means thrusts the cleaning unit into contact with the signal recording surface of the optical disc on detection of a recording and/or reproducing error of information signals by recording and/or reproducing means adapted for recording and/or reproducing the optical disc.

* * * * *